(12) United States Patent
Shiba et al.

(10) Patent No.: US 6,437,912 B2
(45) Date of Patent: Aug. 20, 2002

(54) MICROSCOPE, TRANSILLUMINATION CONDENSER THEREFOR, AND OPTICAL ELEMENT SLIDER

(75) Inventors: Shinichiro Shiba, Kamiina-gun; Toshimi Hayasaka, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/728,085

(22) Filed: Nov. 30, 2000

(30) Foreign Application Priority Data

| Dec. 8, 1999 | (JP) | ............................................. 11-348529 |
| Mar. 17, 2000 | (JP) | ........................................ 2000-076684 |
| Mar. 21, 2000 | (JP) | ........................................ 2000-078721 |

(51) Int. Cl.$^7$ ............................................. G02B 21/00
(52) U.S. Cl. ...................... 359/383; 359/379; 359/390; 359/369
(58) Field of Search ................................. 359/379, 383, 359/390, 392, 368, 369, 372, 380, 391, 393

(56) References Cited

U.S. PATENT DOCUMENTS 1,505,418 A * 8/1924 Ott .............................. 359/390

2,365,337 A * 12/1944 Gallasch ...................... 359/390
2,404,888 A * 7/1946 Richards ...................... 359/390
5,870,222 A * 2/1999 Yamamoto et al. ......... 359/368

FOREIGN PATENT DOCUMENTS

JP            7-56091            3/1995

* cited by examiner

*Primary Examiner*—Mohammad Sikder
(74) *Attorney, Agent, or Firm*—Frishauf, Holtz, Goodman & Chick, P.C.

(57) ABSTRACT

A microscope having a mirror for deflecting light from an illumination light source in a direction of an objective lens and illuminating a specimen via a condenser lens disposed above the mirror includes a stage support which is mounted on the upper surface of a base portion to permanently hold a stage, on which a specimen is placed, with respect to the optical axis direction of the objective lens, a condenser body mounted on the upper surface of the base portion, a condenser lens holding member for holding the condenser body, an elevating mechanism for vertically moving the condenser lens holding member, and a focusing mechanism for moving the objective lens in the optical axis direction.

16 Claims, 18 Drawing Sheets

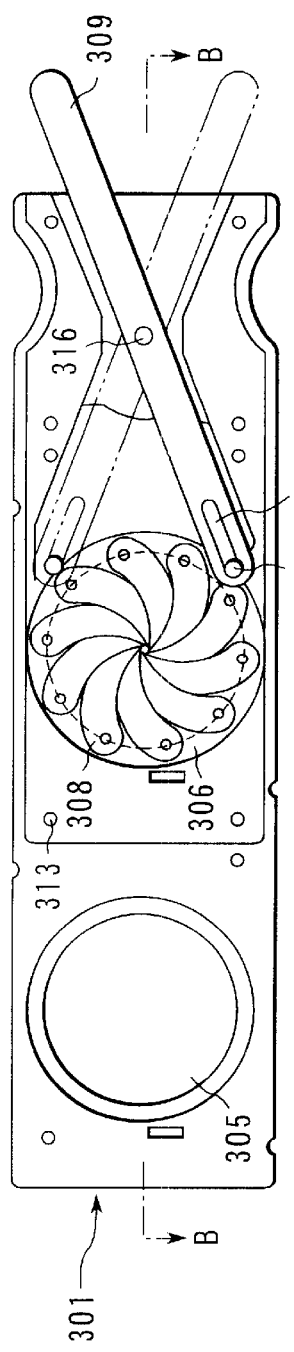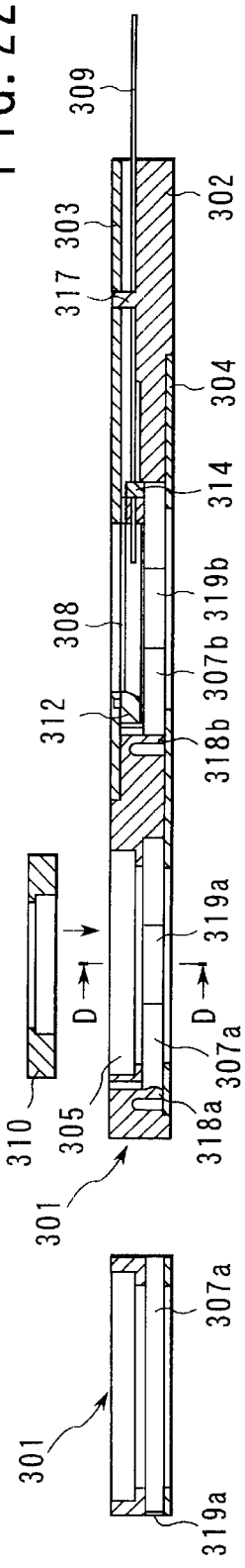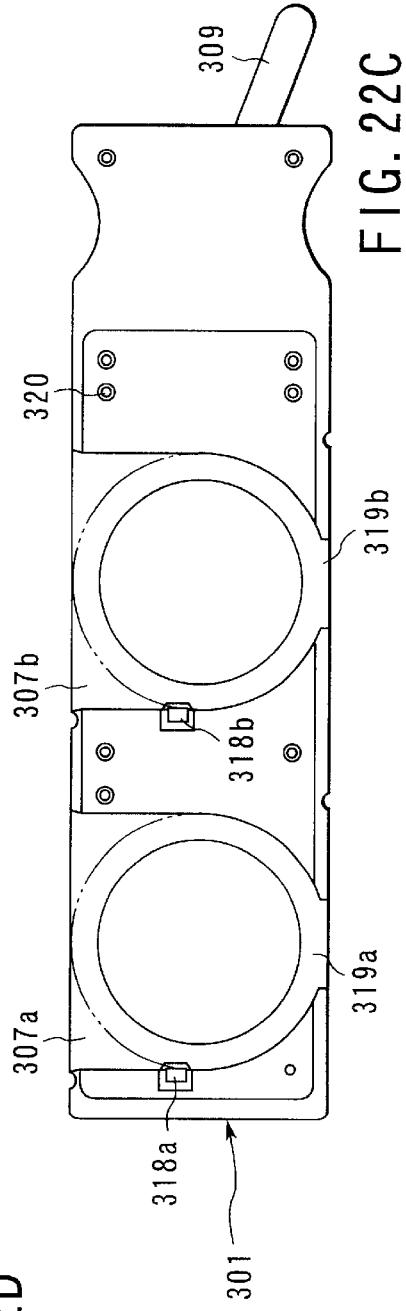

MICROSCOPE, TRANSILLUMINATION CONDENSER THEREFOR, AND OPTICAL ELEMENT SLIDER

CROSS-REFERENCE TO RELATED APPLICATIONS

This application is based upon and claims the benefit of priority from the prior Japanese Patent Applications No. 11-348529, filed Dec. 8, 1999; No. 2000-076684, filed Mar. 17, 2000; and No. 2000-078721, filed Mar. 21, 2000, the entire contents of which are incorporated herein by reference.

BACKGROUND OF THE INVENTION

The present invention relates to an erecting type microscope and a transillumination condenser used therefor.

The present invention also relates to an optical element slider for an microscope.

As shown in FIG. 1, an erecting type microscope (prior art 1) having a transillumination is designed such that a space for a base portion 201, condenser portion 202, and stage portion 203 is ensured between the desk surface and a specimen. In general, the distance from the desk surface to the specimen is about 200 mm.

The base portion 201 needs to have a space for housing collector and relay lenses (not shown) for efficiently guiding light from a light source (not shown) to a specimen.

The condenser portion 202 needs to have a space for ensuring the stroke of vertical movement of a condenser 212 and the stroke of vertical movement of a stage 213 so as to easily interchange dedicated condensers corresponding to various types of microscopes such as a phase-contrast microscope and dark-field microscope or the magnification and type of an objective lens 211. In addition, the stage portion 203 needs to have a space for ensuring the rigidity of the stage 213.

In any case, a focusing handle 214 for focusing the microscope on a specimen and a stage handle 215 for adjusting the observation position of the specimen are disposed at distances of 60 to 80 mm from the upper surface of the table to allow the user to easily operate them while resting his/her hands on the table, minimizing occasions when he/she must move his/her hands in the air. The distance from the focusing handle 214 or stage handle 215 to the upper surface of the stage 213 is therefore set to 120 to 140 mm.

As a "microscope with a focusing mechanism", a technique (prior art 2) is disclosed in Japanese Patent No. 2966514 (registered Aug. 13, 1999). FIG. 6 in this reference shows a revolver elevation type microscope whose object lens vertically moves. A stage 38' is held on a stage support 41 fixed on the upper surface of the base. A condenser 39' is also held on the stage support 41.

As an "optical microscope", a technique (prior art 3) is disclosed in Jpn. Pat. Appln. KOKAI Publication No. 7-174977. Referring to FIG. 7 in this reference, a mount portion 41 of a condenser unit is mounted with a gap with respect to a mount base 40 fixed to the upper surface of the microscope base, and the mount portion 41 can move in the range of this gap.

As a "an illumination optical system for a microscope", a technique (prior art 4) is disclosed in Jpn. Pat. Appln. KOKAI Publication No. 7-56091. This optical system serves as a condenser optical system with a reduced distance from a light source to the position of a specimen. A relay lens for forming a light source image at the position of an aperture stop is divided into two parts, which are respectively disposed before and after a reflecting mirror.

The following problems arise in the above prior arts. In prior art 1, as shown in FIG. 1, when a specimen is to be replaced with another during observation, the user must release the focusing handle 214 or stage handle 215 and remove the specimen placed on the stage 213. The user then must place the next specimen on the upper surface of the stage 213.

In this case, if the focusing handle 214 or stage handle 215 is located far from the upper surface of the stage 213, the moving distance is long. In clinical examinations, an enormous number of specimens, i.e., several hundred to thousand or more specimens, are interchanged a day. If, therefore, the moving distance of the hand is long, fatigue builds up, and the user feels burdensome.

The shorter the distance from the focusing handle 214 or stage handle 215 to the upper surface of the stage 213, the better. In a conventional microscope in which the distance from the upper surface of the table to that of the stage is 200 mm, the moving distance is as long as 120 to 140 mm.

According to the arrangement of prior art 1, the upper surface of the stage 213 cannot be placed at a distance of about 130 mm from the upper surface of the table. The space for the base portion 201 may be reduced by placing, for example, a light-emitting flat plate using a fluorescent lamp or the like below the stage 213 or condenser 212 instead of sending illumination light emitted from the light source through the base portion 201. In this case, however, for example, the brightness decreases, and the requirement for the numerical aperture of the object lens cannot be satisfied. As a consequence, the illumination performance of the prior arts cannot be ensured.

In addition, since a field stop operation ring 216 is generally mounted on the upper surface of the base portion 201 below the condenser 212, the space for this component must also be ensured.

To reduce the space for the condenser portion 202, both the condenser portion 202 and the stage 213 may be lowered so as to reduce the space below the condenser 212. For this purpose, the stroke of vertical movement of the condenser 212 may be decreased. If, however, the stroke of vertical movement of the condenser 212 is decreased, limitations are imposed on the use of the condenser. For example, the condenser cannot be interchanged with another dedicated condenser corresponding to each type of microscope. This makes it impossible to satisfy the requirement for illumination performance.

Furthermore, if the space below the condenser 212 is reduced, the stroke of vertical movement of the state 213, i.e., the focusing guide stroke, is also reduced. To reduce the space for the stage portion 203, the stage 213 itself must be thinned, resulting in a deterioration in stage performance, e.g., a reduction in stage rigidity.

According to prior art 2, even in a revolver elevating type microscope, the condenser is laterally held by the stage support and spaced apart from the upper surface of the stage. It is therefore difficult to decrease the level of the specimen mount surface.

In prior art 3, although the condenser is directly mounted on the upper surface of the stage, a stage elevating scheme is used, and the condenser is designed to vertically move in almost the same stroke as the stroke of vertical movement of the stage to be interlocked with the vertical movement of the stage. This makes it impossible to decrease the level of the specimen mount surface.

In prior art 4, the operation/effect of setting the specimen mount surface at a position lower than the upper surface of the table by using an optical system for reducing the distance from the light source and the specimen is disclosed. However, the arrangement of an actual microscope is not disclosed.

The optical element slider of a conventional microscope will be described next with reference to FIG. 2. In a microscope 331 capable of switching various observation methods, a turret 333 incorporating optical elements 332 such as ring slits is rotatably supported below a stage 340 of the microscope body to easily switch between a bright-field observation and a phase-contrast observation and between a bright-field observation and a dark-field observation.

To change the observation method, the turret 333 is turned to change an optical element 333 on the optical axis.

A base 341 of the microscope body has ND filters 334a and 334b for adjusting the brightness of illumination light independently of the optical elements 332, and a filter inserting/removing unit 335 for inserting/removing the filters, thereby allowing the observer to insert/remove filters as needed.

In a phase-contrast observation and dark-field observation, since a specimen is illuminated through a ring slit, only part of the specimen is illuminated, and hence the visual field becomes dark. In switching from a phase-contrast observation to a bright-field observation or from a dark-field observation to a bright-field observation, since the illuminance difference in the visual field is large, the ND filter 334a or 334b is inserted during a bright-field observation or the brightness of the light source is adjusted by operating a dimmer volume 336 of a dimmer.

In this case, in addition to the ND filters 334a and 334b, an interference filter for increasing the contrast in a phase-contrast observation and a daylight filter for matching color temperatures in a bright-field observation or photographing operation are used. In addition, a polarizing plate is sometimes placed on the filter frame in a polarization observation.

According to the conventional microscope described above, since the optical element slider formed by the turret 333 and the filter attaching/detaching unit 335 are discrete components, switching requires different operations. In a case wherein observations must be frequently switched as in the following case, very complicated operations are required.

① In switching between a phase-contrast observation and a bright-field observation, since the field illuminance difference is large, an ND filter is inserted in a bright-field observation.

② In switching between a phase-contrast observation and a bright-field observation, an interference filter is inserted to increase the contrast in a phase difference observation, and an ND filter or daylight filter is inserted in a bright-field observation.

③ In switching magnification between phase-contrast observations, since many phase-contrast optical elements are dedicated ones corresponding to different magnifications, optical elements are also switched in accordance with a change in magnification. At the same time, as objective lens are interchanged and optical elements are switched, the field illuminance changes. To suppress this change, an ND filter is inserted.

④ In switching between a dark-field observation and a bright-field observation, since the field illuminance differ- ence is large, an ND filter is inserted in a bright-field observation.

In some case, to adjust the field illuminance, the user operates the dimmer volume 336 instead of inserting an ND filter.

In addition, in a bright-field observation, an aperture stop 337 must be operated in accordance with the numerical aperture of the objective lens. In a phase-contrast observation or dark-field observation, the field stop must be opened.

In this case, the optical element slider and aperture stop 337 are discrete components. For this reason, every time a bright-field observation and phase-contrast or dark-field observation are switched, the user must operate the aperture stop 337 as well as switching filters.

To solve the above problem, the optical element slider and the filter frame or aperture stop may be interlocked with each other. This, however, leads to an increase in the number of components or the complexity of the mechanism. As a consequence, the cost increases or the overall size of the microscope increases.

According to a known arrangement, filters are automatically (electrically) switched or the intensity of light is automatically adjusted in accordance with a switched optical element. This arrangement, however, requires a sensor, monitor, electrical components, and the like, resulting in a great increase in cost.

BRIEF SUMMARY OF THE INVENTION

The present invention has been made in consideration of the problems in the prior arts described above, and has as its object to provide a compact, inexpensive, easy-to-operate microscope which can shorten the distance from the stage handle to the upper surface of the stage and maintain illumination performance equivalent to that of the prior arts.

It is another object of the present invention to provide a microscope having high operability, a simple arrangement, and a compact optical element slider, which allows optical components such as optical elements and filters to be simultaneously switched by one switching operation.

It is still another object of the present invention to provide a transillumination condenser which can be mounted in the microscope.

In order to achieve the above objects, according to the first aspect of the present invention, there is provided a microscope having a mirror for deflecting light from an illumination light source in a direction of an objective lens and illuminating a specimen via a condenser lens disposed above the mirror, comprising: a stage support which is mounted on an upper surface of a base portion of the microscope to fix a stage, on which a specimen is placed, with respect to an optical axis direction of the objective lens; a condenser body mounted on the upper surface of the base portion of the microscope; a condenser lens holding member which holds a condenser lens and which is supported by the condenser body; an elevating mechanism which vertically moves the condenser lens holding member; and a focusing mechanism which moves the objective lens in the optical axis direction.

According to the second aspect of the present invention, there is provided a microscope defined in the first aspect, wherein the stage support has a cantilever structure mounted on the base portion.

According to the third aspect of the present invention, there is provided a microscope defined in the first aspect, wherein the condenser lens holding member is rotatable with respect to the base portion, and the condenser lens can be removed from an illumination optical path by rotating the condenser lens holding member.

According to the fourth aspect of the present invention, there is provided a microscope defined in the first aspect, wherein the microscope further comprises a fixed frame mounted on the base portion, a centering frame which is mounted on the fixed frame to center the condenser lens, and an aperture stop mounted on the centering frame, the elevating mechanism comprises a fixed guide integrally formed on the centering frame and mounted along a side surface of the base portion, and a movable guide mounted to be movable with respect to the fixed guide, and the condenser lens holding member is mounted on the movable guide.

According to the fifth aspect of the present invention, there is provided a microscope defined in the first aspect further comprising an optical element slider which has at least two light beam through holes and can selectively insert one of the light beam through holes in an optical axis of an optical device, the optical element slider mounting and stacking an optical element having a pupil modulation function and an optical component having no pupil modulation function in the optical axis direction in each of the light beam through holes.

In the microscope according to the fifth aspect, the stage is permanently held on the stage support mounted on the upper surface of the base portion, and the condenser lens and its holding members are disposed on the upper surface of the base portion inside the stage and stage support, thereby making the illumination optical system low while maintaining the same illumination function as that of the prior art. In addition, even if the focal position of the condenser deviates due to a change in the thickness of a specimen or the like, the focal position can be adjusted by using the elevating mechanism for the condenser lens holding member for holding the condenser lens.

In the microscope according to the fifth aspect, the optical element slider may be designed such that in the respective light beam through holes, optical elements each having a pupil modulation function are mounted on the upper surface of the optical element slider, while optical components having no pupil modulation function are inserted in the opening portions formed in a side surface of the slider and mounted therein.

In the microscope according to the first aspect, the stage is permanently held on the stage support mounted on the upper surface of the base portion, and the condenser lens and its holding members are disposed on the upper surface of the base portion inside the stage and stage support, thereby making the illumination optical system low while maintaining the same illumination function as that of the prior art. In addition, even if the focal position of the condenser deviates due to a change in the thickness of a specimen or the like, the focal position can be adjusted by using the elevating mechanism for the condenser lens holding member for holding the condenser lens.

In the microscope according to the second aspect, in addition to the above effects, since the stage support has a cantilever structure mounted on the base portion on the back side of the condenser body, the respective members of the transillumination condenser can be housed and interchanged in the space secured by the cantilever structure.

In the microscope according to the third aspect, in addition to the above effects, since the condenser lens holding member is rotatable and the condenser lens can be freely inserted/removed in/from the illumination optical path, even if objective lenses having different magnifications are interchanged, the condenser lens can be easily inserted/removed in/from the illumination optical path within a narrow space.

The microscope according to the fourth aspect comprises the fixed guide integrally formed on the centering frame and vertically extending along the side surface of the body base portion, the movable guide movably supported on the fixed guide, the lens holding frame supported on the movable guide, the condenser lens group mounted on the lens holding frame, and the moving mechanism for vertically moving the movable guide. With this arrangement, a sufficient guide length can be secured, with which the condenser lens group is vertically moved by the fixed and movable guides, to realize stable operation, and a large space for operation can be ensured.

According to the microscope of the fifth aspect, there is provided a compact optical element slider with high operability and a simple arrangement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 22A is a plan view showing the slider from which a cover is removed;

FIG. 22B is a sectional view taken along a line B—B in FIG. 22A and viewed from the direction indicated by the arrows;

FIG. 22C is a bottom view showing the slider from which a bottom cover is removed; and FIG. 22D is a sectional view taken along a line D—D in FIG. 22B and viewed from the direction indicated by the arrows.

DETAILED DESCRIPTION OF THE INVENTION

Prior to a description of the embodiments of the present invention, the stroke of vertical movement of a transillumination condenser according to the present invention will be described. The focusing handle and stage handle of an erecting type microscope are ideally set at a level of 60 to 80 mm from the upper surface of the table in consideration of operation. For this reason, to shorten the distance between the upper surface of the stage and the handle, the upper surface of the stage must be brought close to the handle side. In this case, the total length of the stage handle held on the stage must be reduced in advance.

The upper surface of the stage is ideally flush with the focusing handle and stage handle. In this case, however, the focusing handle interferes with the stage, and the stage handle must be placed below the upper surface of the stage from a structural viewpoint and hence cannot be located at a distance of 60 to 80 mm from the upper surface of the table. For these reasons, the upper surface of the stage is preferably set at a distance of about 130 mm from the upper surface of the table.

To reduce the space for the condenser portion, therefore, the stroke of vertical movement of the condenser is preferably minimized.

The stroke of vertical movement of the condenser is required, excluding a stroke for the interchange of condensers, for the correction of a change in the thickness of slide glasses. In general, slide glasses used for clinical examinations have thicknesses of 0.9 to 1.4 mm, typically 1 mm. Assume that the condenser is vertically positioned when a slide glass has a thickness of 1 mm. In this case, when the thickness of a slide glass becomes 0.9 mm, and a refractive index nd of the glass is 1.5, amount of change in air-reduced length=$t \times nd$=(0.9−1)×1.5=−0.15 mm That is, the distance between the specimen and the condenser must be reduced by 0.15 mm.

In contrast to this, when the thickness of a slide glass becomes 1.4 mm, amount of change in air-reduced length=(1.4−1)×1.5=0.6 mm In this case, the distance between the specimen and the condenser must be increased by 0.6 mm.

It therefore theoretically suffices if the total stroke of vertical movement of the condenser is 0.75 mm. In practice, in consideration of variations in dimension and easy assembly, a stroke of 1 mm or more is expected in the upward and downward directions each, and a stroke of about 3 mm will suffice.

The embodiments of the present invention will be described in detail below.

(First Embodiment)

Figure 3:
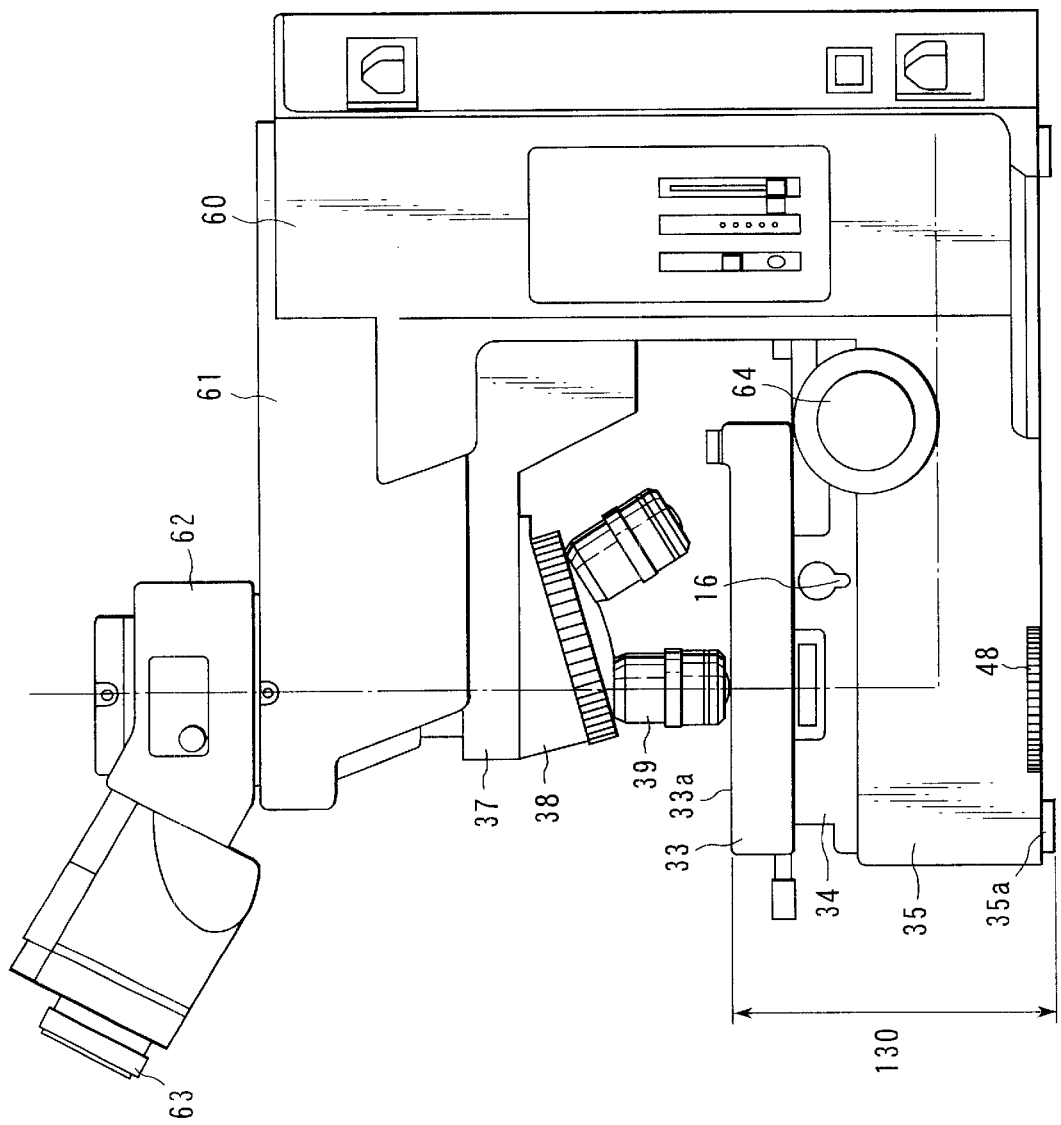
FIG. 3 is a side view of an erecting type microscope according to the first embodiment.
Figure 4:
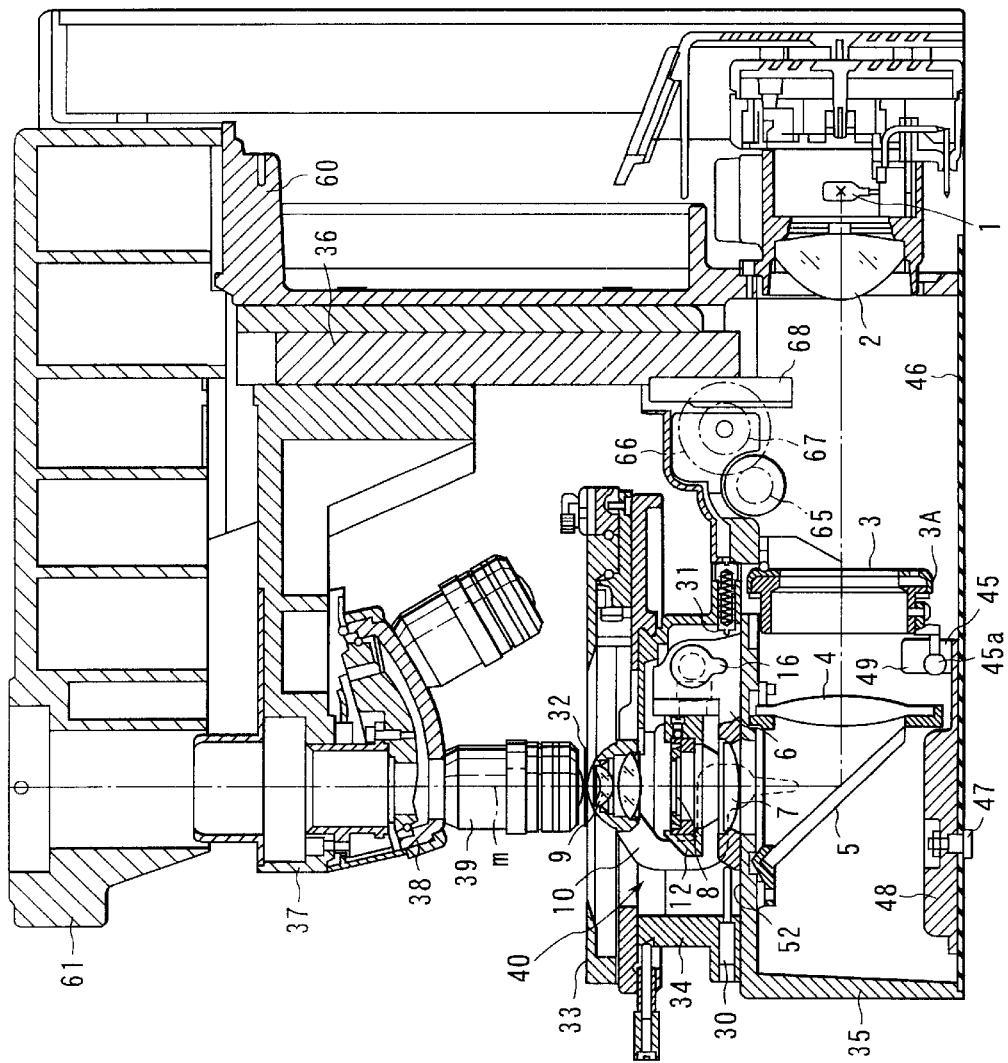
FIG. 4 is a cross-sectional view of the erecting type microscope according to the first embodiment.
Figure 5:
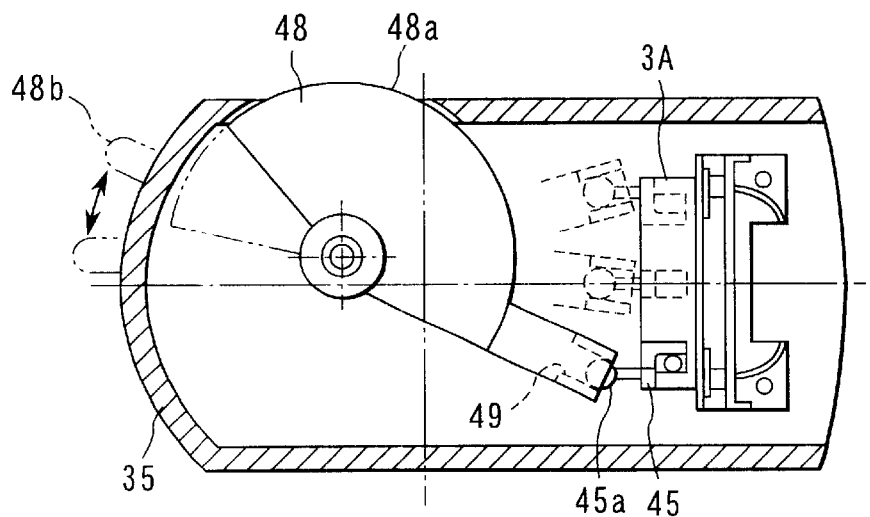
FIG. 5 is a bottom view of the erecting type microscope according to the first embodiment.
Figure 6:
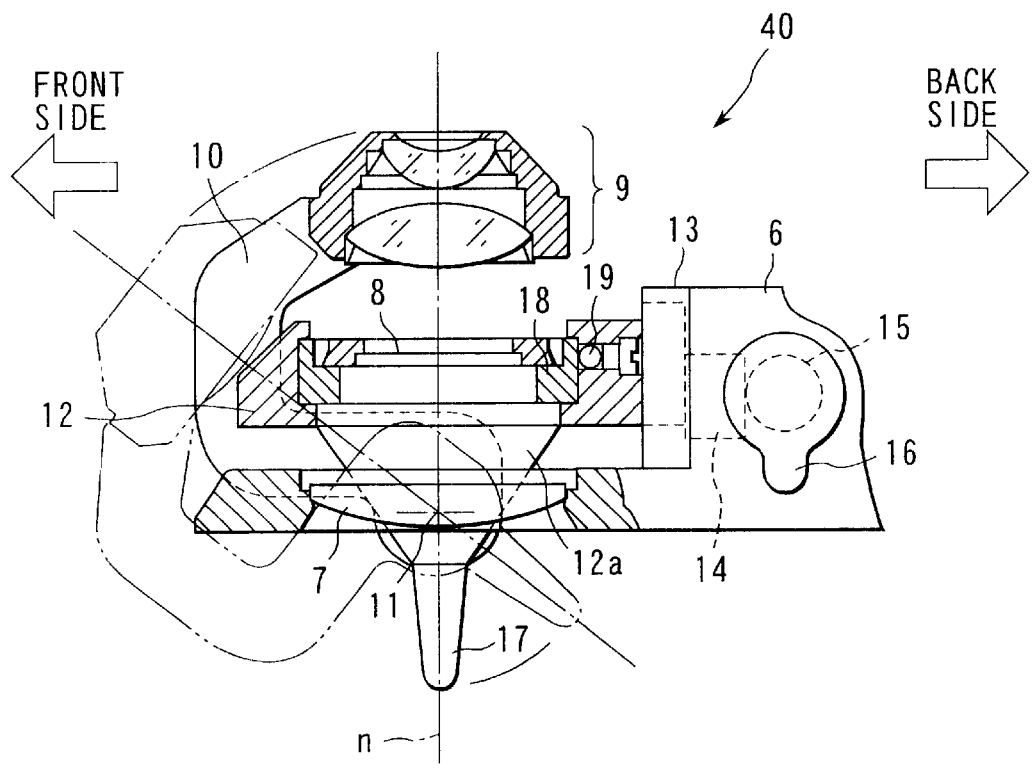
FIG. 6 is a partly cutaway side view of a transillumination condenser according to the first embodiment.
Figure 7:
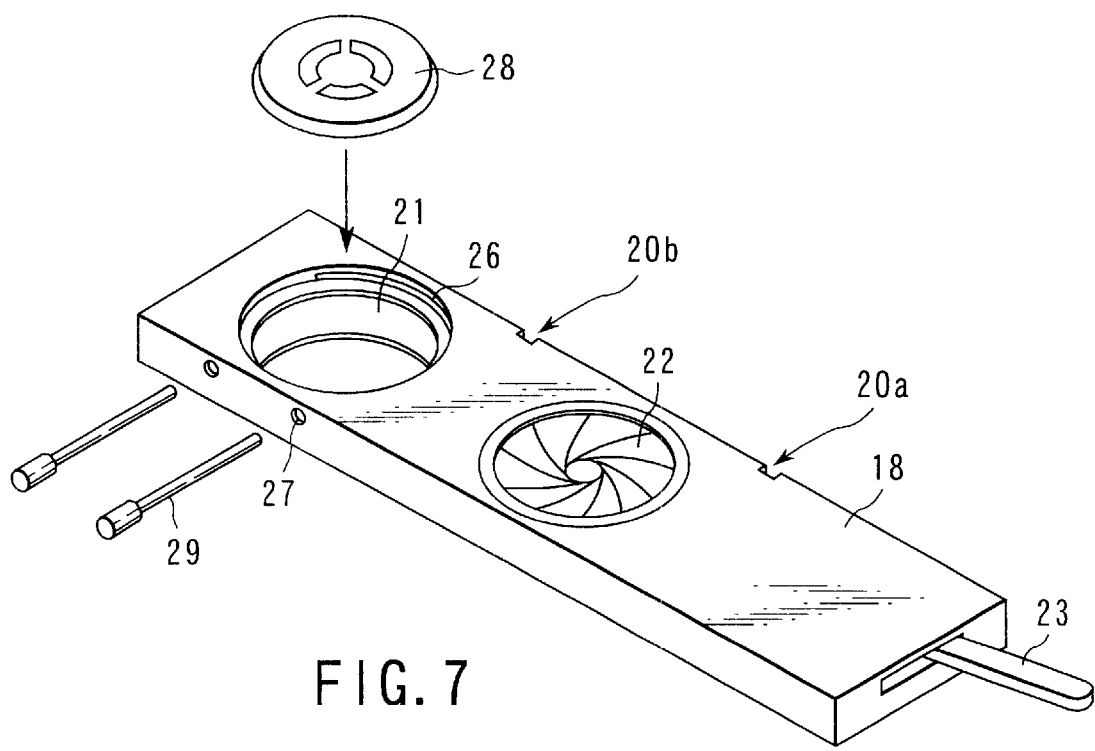
FIG. 7 is a perspective view showing a pupil modulation optical element, slider, and centering jig according to the first embodiment.

FIGS. 3 to 7 show the first embodiment. FIG. 3 is a side view of an erecting type microscope. FIG. 4 is a cross-sectional view of the erecting type microscope. FIG. 5 is a bottom view of the erecting type microscope. FIG. 6 is a partly cutaway side view of a transillumination condenser. FIG. 7 is a perspective view showing a pupil modulation optical element, slider, and centering tool.

Referring to FIG. 3, the erecting type microscope is mainly comprised of a microscope body 60, a base 35 serving as a base portion protruding from the lower portion of the microscope body 60, a stage support 34 fixed on the base 35, a stage 33 fixed on the stage support 34, a revolver table 37 fixed to a focusing guide 36 (see FIG. 4) incorporated in the microscope body 60, a revolver 38 attached to the lower surface of the revolver table 37, a plurality of objective lenses 39 mounted on the revolver 38, an arm portion 61 protruding from the upper portion of the microscope body 60, a lens barrel 62 mounted on the arm portion 61, and an eyepiece 63 mounted in the lens barrel 62.

The distance from a bottom surface 35a of this erecting type microscope to an upper surface 33a of the stage 33 is set to about 130 mm. A focusing handle 64 for vertically moving the objective lenses 39 and an FS lever 48 for operating a field stop 3 (see FIG. 4) are disposed on a side surface of the base 35.

A CD lever 16 for vertically moving a condenser front element 9 (see FIG. 6) of a transillumination condenser 40 (see FIG. 6) to be described later is disposed on a side surface of the stage support 34.

Referring to FIG. 4, an illumination optical system is disposed in the base 35. More specifically, a light source lamp 1 serving as an illumination light source for emitting illumination light, a collector lens 2 for collecting illumination light from the light source lamp 1, the field stop 3 for restricting the collected illumination light, a relay lens 4 for guiding the illumination light, and a return mirror 5 for bending the optical path of the illumination light upward.

A condenser pedestal surface 52 is formed on the upper surface of the base 35 above the return mirror 5. The transillumination condenser 40 (see FIG. 6) is placed on the condenser pedestal surface 52 so as to be horizontally movable.

A centering seat 6, which is the condenser body of the transillumination condenser 40, is translated with respect to an observation optical axis m, which is the optical axis of each objective lens, by using a CD centering knob 30 and plunger 31 disposed on the stage support 34 placed around the transillumination condenser 40, thereby aligning the center of the field stop 3 with the observation optical axis m.

As shown in FIGS. 4 and 5, the field stop 3 has a stop ring 3A. As the stop ring 3A pivots, a plurality of aperture blades (not shown) open/close.

A pivot 45 having a ball-like distal end portion 45a is fixed to the stop ring 3A. When a U-shaped slide portion 49 of the FS lever 48 serving as an operation lever engages with the distal end portion 45a of the pivot 45, and the FS lever 48 pivots, the stop ring 3A pivots.

The FS lever 48 is rotatably mounted on a bottom plate 46 mounted on the lower portion of the base 35 through a shaft 47. An observer can operate the field stop 3 by rotating an outer circumferential surface 48a exposed on a side surface of the base 35.

Note that an operating portion 48b like the one indicated by the dotted line in FIG. 5 may be formed on the FS lever 48 and exposed on the front surface side of the base 35 to allow the observer to adjust/operate the field stop from the front surface side of the microscope.

As shown in FIG. 4, the revolver table 37 is fixed to the vertically movable focusing guide 36, and a rack 68 is mounted on the lower portion of the focusing guide 36. A pinion 65 is fixed to be coaxial with the above focusing handle 64 (see FIG. 3), and a wheel 66 and pinion 67 serving as intermediate gears are coaxially disposed between the pinion 65 and the rack 68.

The pinion 65 meshes with the wheel 66. The pinion 67 meshes with the rack 68. When the focusing handle 64 pivots, the rotating motion is transferred to the pinion 65, wheel 66, pinion 67, and rack 68 to vertically move the focusing guide 36. Then, the revolver table 37, revolver 38, and objective lens 39 move vertically. As a consequence, the objective lens 39 is focused on a specimen 32 on the stage 33.

A focusing mechanism is constituted by the focusing handle 64, pinion 65, wheel 66, pinion 67, rack 68, focusing guide 36, revolver table 37, and revolver 38.

The transillumination condenser 40 will be described next. A large space is secured in the stage support 34. The transillumination condenser 40 is disposed in this space.

The transillumination condenser 40 is held on the upper surface of the base 35 of the microscope body 60 in this space so as to be centered, as described above. As shown in FIG. 6, a first condenser lens 7 is disposed on an illumination optical axis n of the centering seat 6 of the transillumination condenser 40. A slide dove-tail 13 is placed on a side surface of the upper portion of the centering seat 6. A slider frame 12 is held by the slide dove-tail 13 to be vertically movable. The slider frame 12 is positioned near a back-side focal plane 8.

A rack 14 is attached to the slider frame 12. The rack 14 meshes with a pinion 15 fixed to be coaxial with the CD lever 16 mounted on the centering seat 6.

By rotating the CD lever 16, the slider frame 12, a bounce column 10 (to be described later), the condenser front element 9, and the back-side focal plane 8 can be vertically moved. This makes it possible to correct the focal position of illumination light in accordance with the thickness of a slide glass.

An elevating mechanism is constituted by the CD lever 16, pinion 15, rack 14, slide dove-tail 13, and slider frame 12.

A support arm 12a vertically extends from a side surface (the back surface side of FIG. 6) of the slider frame 12, and the bounce column 10 serving as a condenser lens holding member is rotatably held on the side surface of the slider frame 12 with a fulcrum 11 serving as a pivot.

The condenser front element 9 serving as a condenser lens is fixed on the upper end portion of the bounce column 10 to be aligned with the illumination optical axis n. A bounce lever 17 is attached to the lower end portion of the bounce column 10. By rotating the bounce lever 17 backward, the condenser front element 9 can be moved to the position indicated by the chain double-dashed line, thus removing the condenser front element 9 from the illumination optical path.

As shown in FIG. 4, the relay lens 4 and first condenser lens 7 form illumination light from the collector lens 2 into an image at the position of the back-side focal plane 8, and convert an image of the field stop 3 into a parallel light beam. The condenser front element 9 collimates the illumination light from the collector lens 2 and guides it to the specimen, and forms an image of the field stop 3 at the observation position of the specimen 32.

As shown in FIG. 6, a slider 18 is fitted in the slider frame 12 to be horizontally movable. A click ball 19 is disposed on a side surface of the slider frame 12 to be biased inward. As shown in FIG. 7, by engaging the click ball 19 with a click groove 20a or 20b of the slider 18, the observation optical axis m (see FIG. 4) and the center of a slider hole 21 or aperture stop 22 can be aligned with each other.

The aperture stop 22 can be opened/closed by operating an AS lever 23. A pupil modulation optical element 28 is inserted in the slider hole 21, and a centering spring 26 and centering knob 27 are embedded in the slider hole 21.

After the pupil modulation optical element 28 is inserted in the slider hole 21, the center of the pupil modulation optical element 28 can be accurately aligned with the observation optical axis m by using a centering tool 29. As the pupil modulation optical element 28, an element corresponding to each type of microscopy is prepared.

The operation of the erecting type microscope will be described next. First of all, as shown in FIG. 4, in the illumination optical system, illumination light emitted from the light source lamp 1 is collected by the collector lens 2 and passes through the field stop 3 and relay lens 4, and the optical path of the light is bent upward by the return mirror 5.

The illumination light emerging from the condenser front element 9 through the first condenser lens 7 fixed on the centering seat 6 and the back-side focal plane 8 of the condenser illuminates the specimen 32 placed on the stage 33.

In a bright-field state in which the objective lens 39 has a magnification of 4× to 100×, an observation is performed while the condenser front element 9 is set in the illumination optical path. In this case, the optical axis n (see FIG. 6) of the condenser 40 is aligned with the observation optical axis m with the CD centering knob 30, and the focus of the transillumination condenser 40 can be adjusted by vertically moving the slider frame 12 with the CD lever 16.

If the magnification of the objective lens 39 is as low as less than 4×, an observation can be performed upon removing the condenser front element 9 from the illumination optical path by operating the bounce lever 17.

In addition, by fitting the slider 18 in the slider frame 12 and setting the aperture stop 22 in the illumination optical path, the aperture stop can be used. Furthermore, by inserting the pupil modulation optical element 28 in the slider hole 21 and inserting the slider hole 21 in the illumination optical path, an observation can be performed by microscopy such as phase-contrast microscopy.

According to this embodiment, the space for the condenser portion can be reduced while satisfactory illumination performance is obtained in accordance with type of microscopy and the magnification of the objective lens.

Therefore, the upper surface of the stage can be set at a distance of about 130 mm from the upper surface of the table (the bottom surface of the microscope) without any deterioration in operability. In addition, the distances from the focusing handle and stage handle to the upper surface of the stage can be decreased.

Furthermore, since the slide dove-tail, CD lever, and centering slide surface of the transillumination condenser are mounted on the centering seat, the number of components can be decreased, and the cost can be reduced.

(Second Embodiment)

Figure 8:
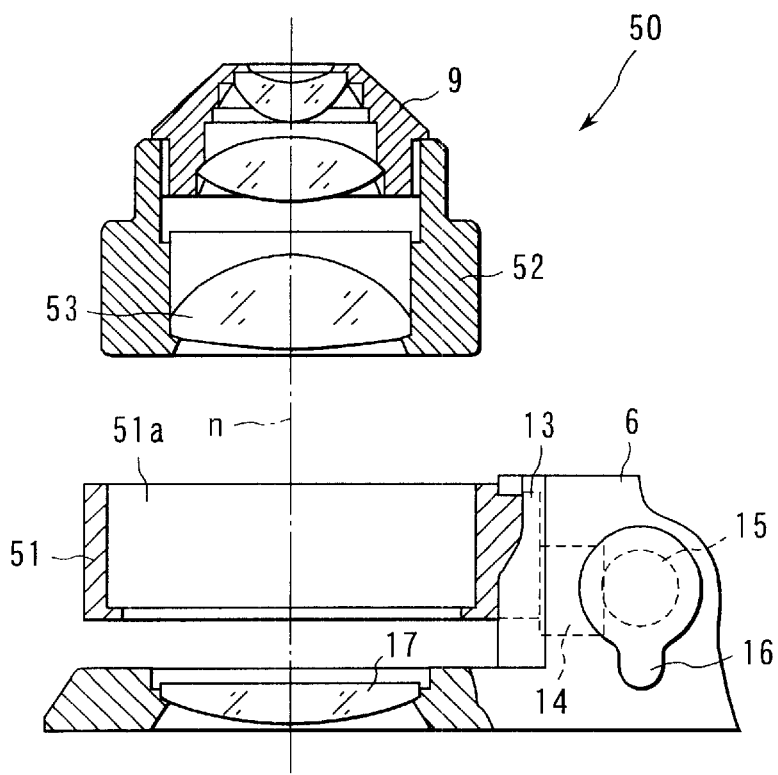
FIG. 8 is a partly cutaway view of a transillumination condenser according to the second embodiment.
Figure 9:
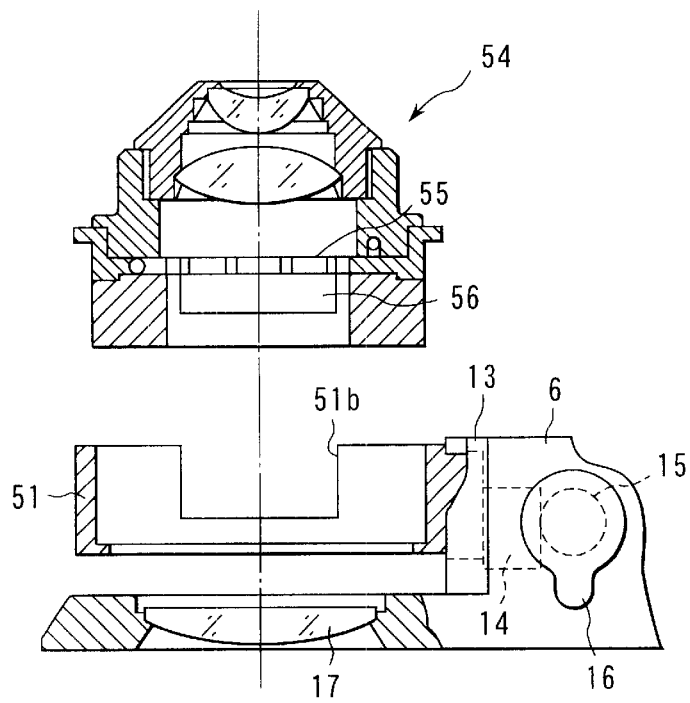
FIG. 9 is a partly cutaway side view of a modification of the transillumination condenser according to the second embodiment.

FIGS. 8 and 9 show the second embodiment. FIG. 8 is a partly cutaway side view of a transillumination condenser. FIG. 9 is a partly cutaway side view of a modification of the transillumination condenser.

This embodiment differs from the first embodiment only in the transillumination condenser, and other portions of the embodiment are the same as those of the first embodiment. For this reason, only different portions will be described below, and the illustration and description of other portions will be omitted.

The same reference numerals as those of identical parts of the transillumination condenser 40 according to the first embodiment denote the same parts in FIG. 8, and a description thereof will be omitted.

Referring to FIG. 8, a slide dove-tail 13 is mounted on a side surface of the upper portion of a centering seat 6 of a transillumination condenser 50. A condenser support 51 is held by the slide dove-tail 13, in place of the slider frame 12 in the first embodiment, to be vertically movable. A rack 14 is attached to the condenser support 51. The rack 14 meshes with a pinion 15 mounted to be coaxial with a CD lever 16 mounted on the centering seat 6. A blind hole 51a is formed in the condenser support 51 to be coaxial with an illumination optical axis n.

A condenser holding portion 52 is juxtaposed on a condenser front element 9. A third condenser lens 53 is placed on the illumination optical axis n. The circumferential portion of the condenser holding portion 52 is fitted in the blind hole 51a of the condenser support 51 to be positioned/fixed. Other arrangements are the same as those of the first embodiment.

According to this embodiment, in addition to the effects of the first embodiment, if the condenser holding portion 52 is a condenser lens compatible with the condenser support 51, the condenser lens can be freely interchanged with another. In addition, by preparing a condenser lens finely adjusted to the performance of each type of objective lens, the illumination performance can be improved.

In place of the third condenser lens 53 of this embodiment, a transillumination condenser 54 having an aperture stop 55 and slot 56 for the insertion of an optical element slider can be used, as shown in FIG. 9.

In this case, a recess 51b is formed in the condenser support 51 to allow the use of an optical element slider. With this transillumination condenser 54, condensers can be interchanged in accordance with the types of objective lenses to be used. In addition, an aperture stop, ring slit, and filter can be used while they are mounted on the optical element slider.

(Third Embodiment)

Figure 11:
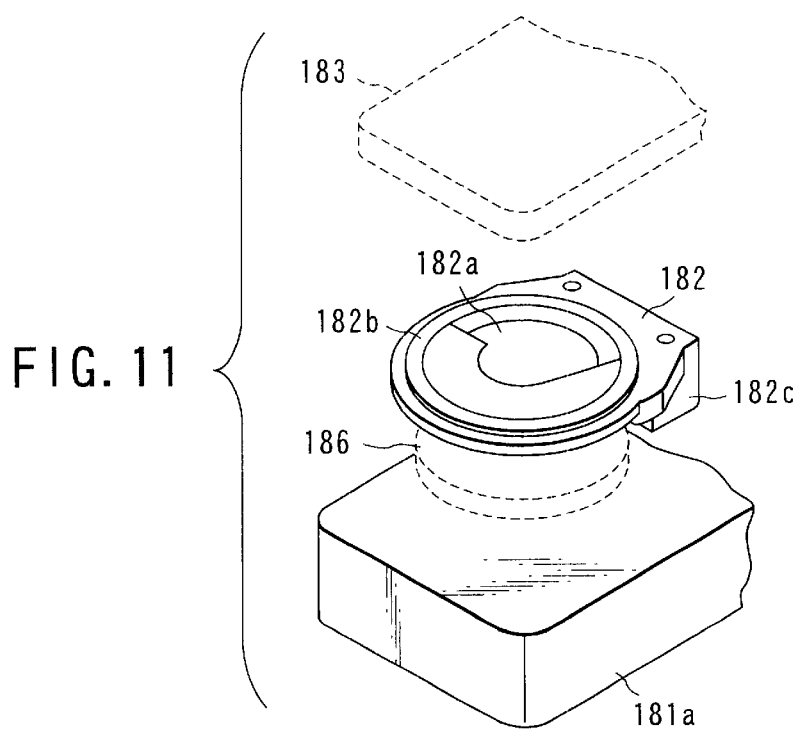
FIG. 11 is a perspective view showing the relationship in mounting between the transillumination condenser and the stage support according to the third embodiment.
Figure 10:
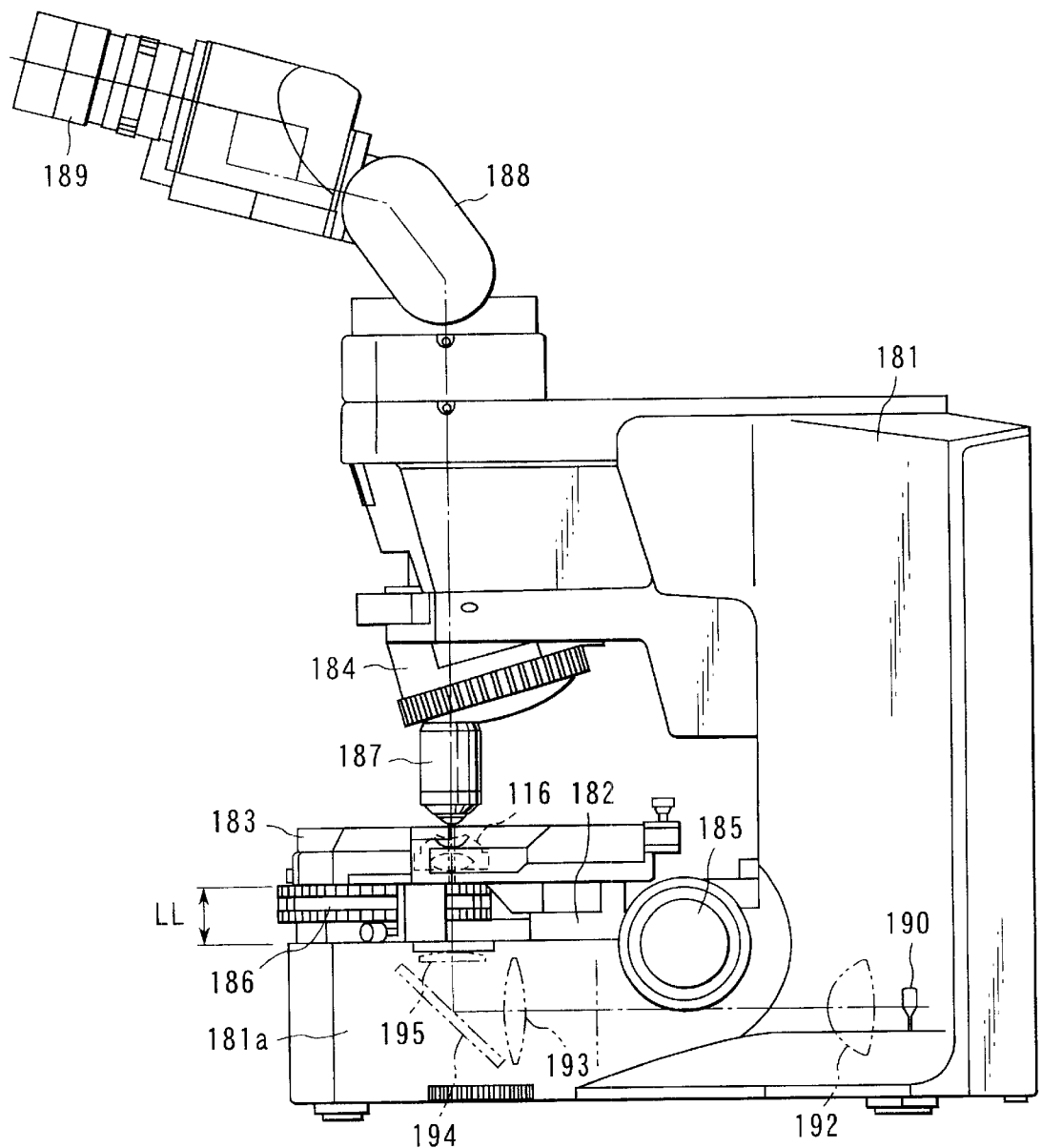
FIG. 10 is a side view showing a pathological examination microscope according to the third embodiment.
Figure 12:
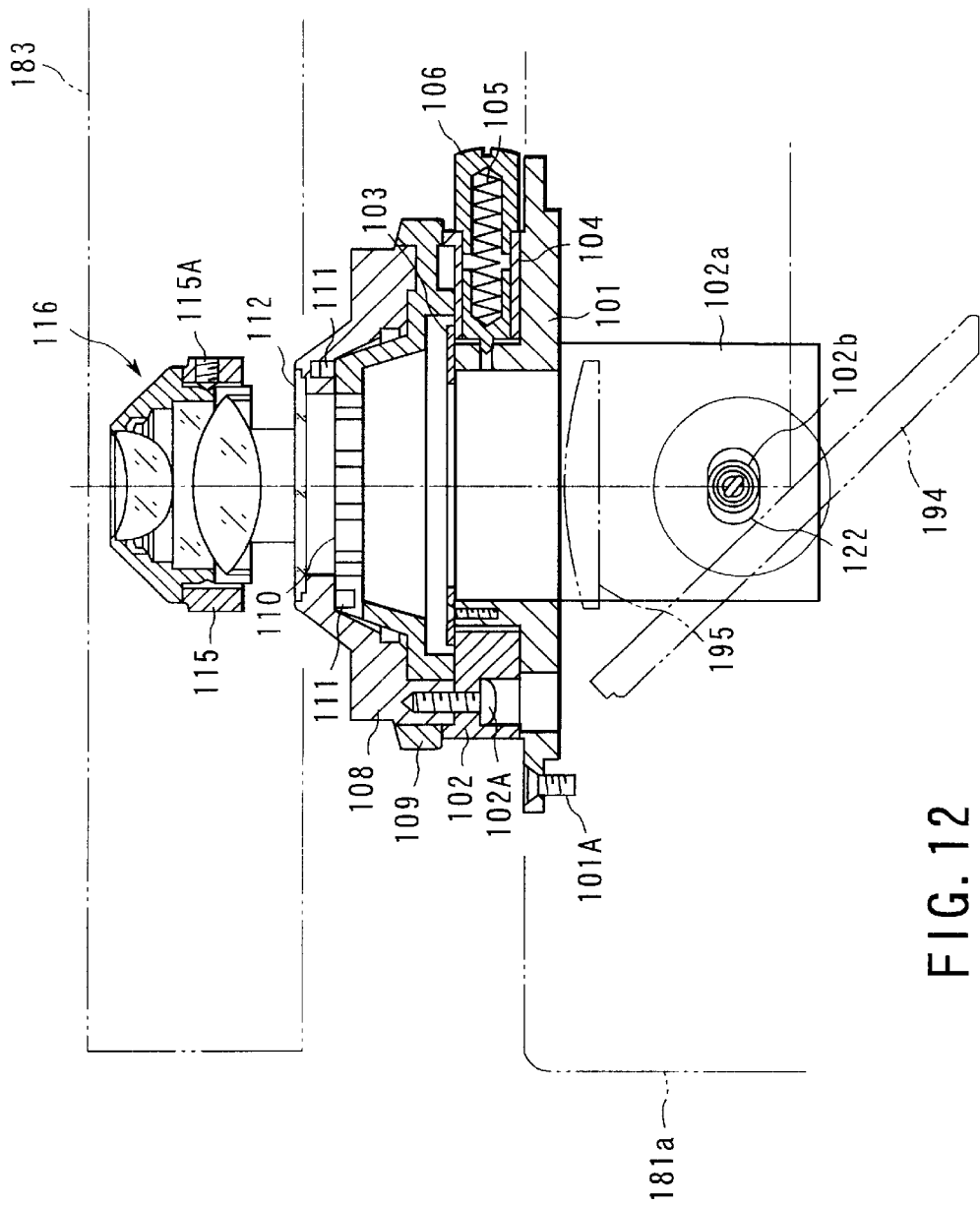
FIG. 12 is a cross-sectional view of the transillumination condenser according to the third embodiment.
Figure 13:
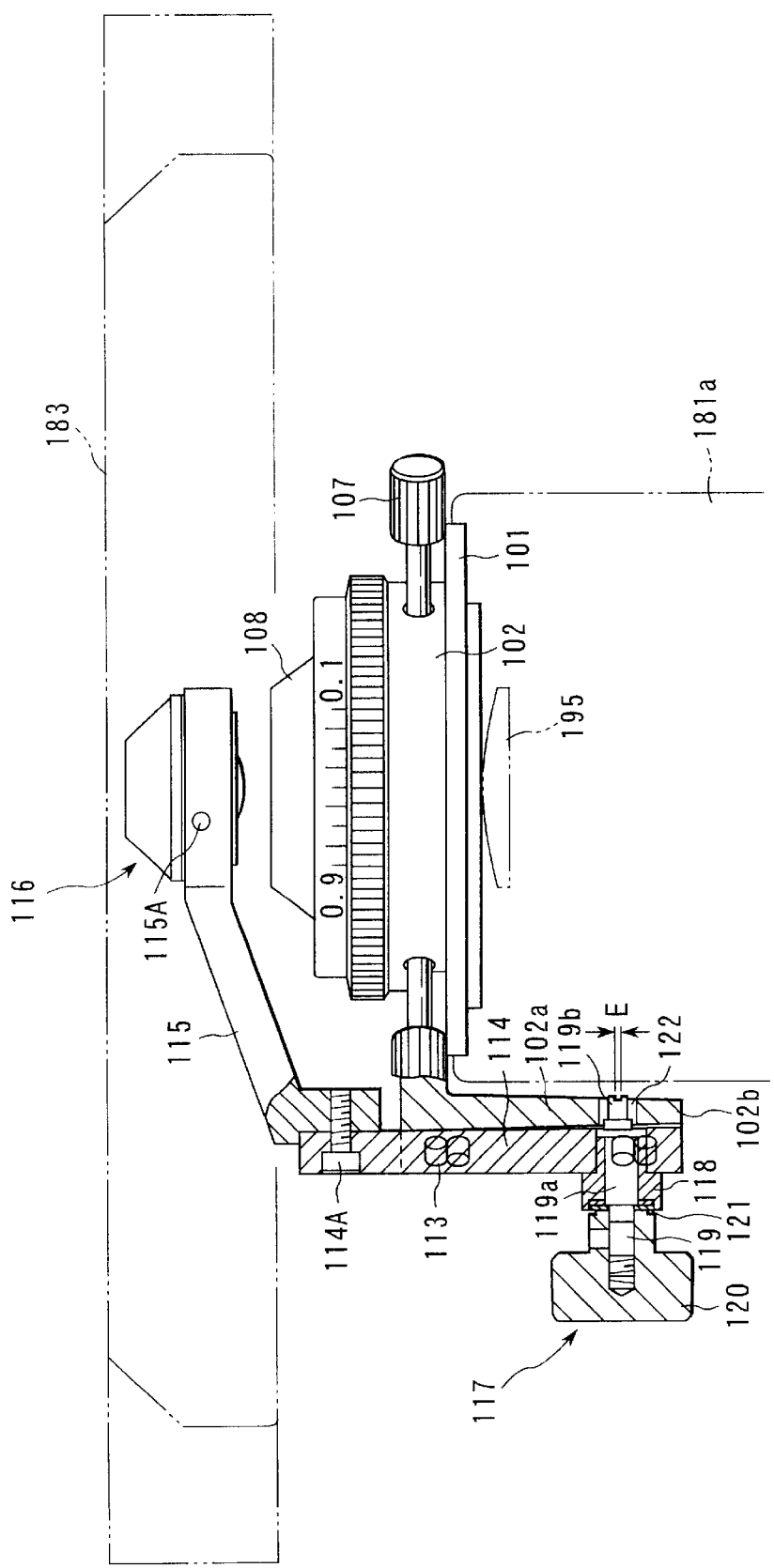
FIG. 13 is a partly cutaway front view of the transillumination condenser according to the third embodiment.

FIGS. 10 to 13 show the third embodiment. FIG. 10 is a side view of a pathological examination microscope. FIG. 11 is a perspective view showing the relationship in mounting between a transillumination condenser and a stage support. FIG. 12 is a sectional side view of the transillumination condenser. FIG. 13 is a partly cutaway front view of a portion of the transillumination condenser. Each of the transillumination condensers according to the third to fifth embodiments is mounted in the pathological examination microscope as an erecting type microscope of this embodiment.

This embodiment will be descried below on the premise that each transillumination condenser is mounted in a pathological examination microscope. However, each of the transillumination condensers according to the third to fifth embodiments can be mounted in any microscope designed to fix a stage with its surface being set at a low level.

Referring to FIG. 10, a stage support 182 is fixed to a body base portion 181a serving as the base portion of a microscope body 181. A stage 183 is detachably mounted on the stage support 182. A revolver 184 is attached to a guide mechanism (not shown) incorporated in the microscope body 181. By operating a focusing handle 185, the guide mechanism is moved by a moving mechanism such as a rack pinion and the like (not shown), thereby vertically moving the revolver 184.

A focusing mechanism is constituted by the focusing handle 185, moving mechanism, guide mechanism, and revolver 184. Reference numeral 186 denotes a transillumination condenser according to the present invention. FIG. 10 is a view showing a transillumination condenser according to the fifth embodiment. Although each of transillumination condensers according to the third and fourth embodiments is disposed at the same position as in FIG. 10, a detailed description thereof will be omitted because it will be described in each embodiment described later.

Referring to FIG. 11, the stage support 182 includes a disk-like stage mount portion 182b having a light beam hole 182a formed in the center of the upper surface, and is fixed to the body base portion 181a through a leg portion 182c.

The leg portion 182c is formed on only the back side of the stage support 182 so that the stage 183 is supported by a cantilever structure. The transillumination condenser 186 is disposed in the space secured below the stage mount portion 182b by the cantilever structure for the stage support 182 and is mounted on the upper surface of the body base portion 181a. As this transillumination condenser 186, one of the condensers shown in FIGS. 12 to 19 can be used.

In the pathological examination microscope having the above arrangement, an illumination light beam emitted from a light source lamp 190 passes through illumination optical systems 192, 193, 194, and 195 incorporated in the body base portion 181a, and illuminates a specimen placed on the upper surface of the stage 183 through a condenser lens group 116 of the transillumination condenser 186. The user operates the focusing handle 185 to vertically move the revolver 184 so as to set the specimen in focus, and observes the specimen through an objective lens 187 attached to the revolver 184 and an eyepiece 189 attached a lens barrel 188.

In this pathological examination microscope, to set the stage surface at a low level, a distance LL between the lower surface of the stage 183 and the upper surface of the body base portion 181a is set to be very small.

The transillumination condenser mounted in the above pathological examination microscope will be described next. Referring to FIGS. 12 and 13, a fixed frame 101 is fixed on the body base portion 181a with a small screw 101A. A centering frame 102 serving as the condenser body is clamped between the fixed frame 101 and a press plate 103 to be horizontally movable.

A spring barrel 104 is slidably mounted on the centering frame 102, and a spring 105 is mounted in the centering frame 102. A spring cover 106 threadably engages with the centering frame 102 and is supported to compress the spring 105 and bias the spring barrel 104.

On the opposite side of the centering frame 102 to the side where the spring cover 106 is attached, a pair of left and right centering screws 107 are engaged in the centering frame 102 toward its center. The centering frame 102 is mounted on the fixed frame 101 such that the centering frame 102 can be centered by moving the centering screws 107 back and forth against the biasing force of the spring 105.

An aperture stop frame 108 is concentrically fixed on the upper surface of the centering frame 102 with a small screw 102A. A stop operation ring 109 is rotatably fitted on the aperture stop frame 108.

A plurality of aperture blades 110 are interposed between the aperture stop frame 108 and the stop operation ring 109. A pair of upper and lower dowel pins 111 are fixed on the aperture blades 110.

One of the dowel pins 111 is rotatably fitted in a hole formed in the aperture stop frame 108, and the other of the dowel pins 111 is engaged with a groove formed in the stop operation ring 109, thereby forming an aperture stop which is an iris stop whose aperture size can be adjusted by rotating the stop operation ring 109 so as to move the plurality of aperture blades 110.

The aperture blades 110 is interposed at the position to almost match the back-side focal plane of the condenser group 116 (to be described later). A dustproof glass 112 is fixed on the upper surface of the aperture stop frame 108.

A fixed guide 102a as the condenser body is vertically mounted on the centering frame 102, integrally with the centering frame 102, along a side surface of the body base portion 181a.

A movable guide 114 is fitted in the fixed guide 102a through rollers 113 to be vertically movable. A lens holding frame 115 as a condenser lens holding member is mounted on the movable guide 114 with a bolt 114A. The condenser lens group 116 as a condenser lens is mounted on the lens holding frame 115 and fixed with a set screw 115A.

A moving mechanism 117 serving as an elevating mechanism for vertically moving the movable guide 114 is disposed between the fixed guide 102a and the movable guide 114.

The moving mechanism 117 is comprised of a bearing 118 fixed to the movable guide 114, an eccentric shaft 119 movably fitted in the bearing 118, a movable handle 120 attached to a shaft portion 119a of the eccentric shaft 119, a leaf spring 121 interposed between the bearing 118 and the movable handle 120, a bearing 122 rotatably fixed to an eccentric distal portion 119b of the eccentric shaft 119, and a long hole 102b (see FIG. 12) which is formed in the fixed guide 102a such that the bearing 122 is engaged in the long hole to be horizontally movable.

The operation of the transillumination condenser having the above arrangement will be described next with reference to FIGS. 10 to 13. An illumination light beam emitted from the light source 190 incorporated in the body base 181a passes through the illumination optical systems 192, 193, 194, and 195 and condenser lens group 116 and illuminates the specimen (not shown) placed on the upper surface of the stage 183.

In this case, the user operates the stop operation ring 109 to change the diameter of the aperture stop so as to adjust the numerical aperture for illumination light. The centering frame 102 is always biased against the fixed frame 101 by the spring barrel 104 and spring 105. Therefore, the centering screws 107 are operated to translate the centering frame 102 so as to center the condenser group 116 in the horizontal direction.

When the movable handle 120 mounted on the eccentric shaft 119 is pivoted, since the bearing 122 rotatably fixed to the eccentric distal portion 119b of the eccentric shaft 119 is engaged in the long hole 102b of the fixed guide 102a to be horizontally movable, the movable guide 114 vertically moves by an amount twice an eccentricity amount E of the eccentric distal portion 119b with respect to the shaft portion 119a.

As the movable guide 114 vertically moves, the condenser lens group 116 mounted on the movable guide 114 vertically moves, thereby focusing the field stop.

Note that the movable handle 120 is designed to be braked by the leaf spring 121, and hence does not spontaneously move. In a pathological examination microscope for observing many specimens while switching them, since most specimens are slide glass specimens and the moving range required for focusing the field stop is set to about 1.5 to 3 mm in consideration of variations in the width of slide glasses, 0.8 to 1.5 mm, and microscope manufacturing errors, even the above eccentric moving mechanism can function satisfactorily.

According to this embodiment, since the fixed guide 102a is integrally and vertically mounted on the centering frame 102 along the side surface of the body base portion 181a, even if the distance LL between the lower surface of the stage 183 and the upper surface of the body base portion 181a is set to be small to lower the level of the stage surface, a sufficient guide length can be ensured, and the vertical movement of the condenser group 116 is stabilized.

In addition, since the guide mechanism is disposed along the side surface of the body base portion 181a, it does not interfere with the adjustment operation of the aperture stop.

The movable handle 120 need not be disposed near the focusing handle and is disposed at a sufficient distance therefrom unlike the prior art. Even if, therefore, the stage surface is set at a low level, good operability can be obtained.

Furthermore, since the stage support is cantilevered, the constituent members of the transillumination condenser can be housed in the space in the form of a cantilever structure. This makes it possible to obtain a compact, inexpensive, easy-to-operate microscope having illumination performance equivalent to that of the prior art.

In this embodiment, although an eccentric movable mechanism is used as the moving mechanism 117, a known rack/pinion mechanism may replace it.

Furthermore, the condenser group 116 may be designed to be detachable. This makes it possible to interchange condenser lens groups with different numerical apertures.

(Fourth Embodiment)

Figure 14:
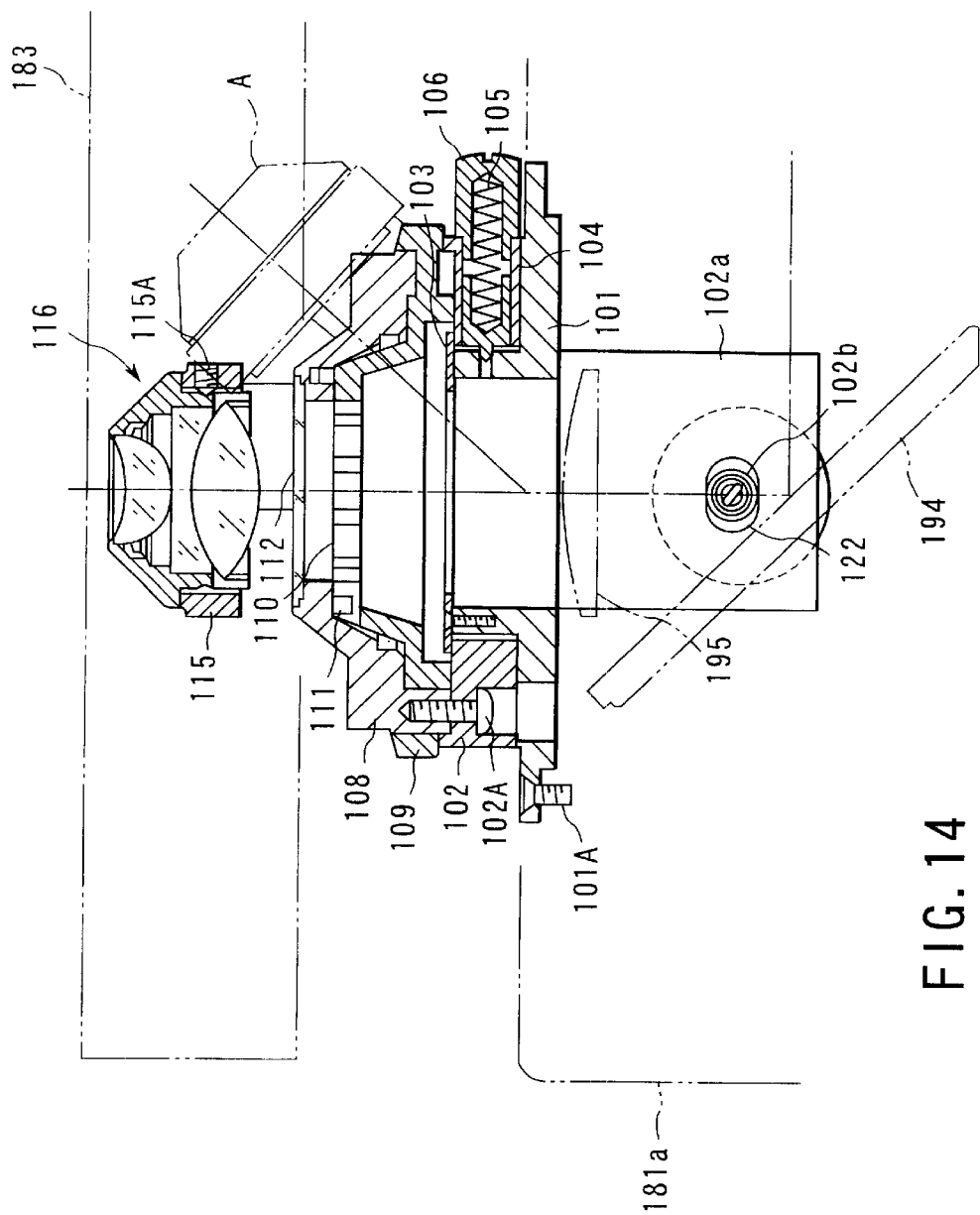
FIG. 14 is a cross-sectional view of a transillumination condenser according to the fourth embodiment.
Figure 15:
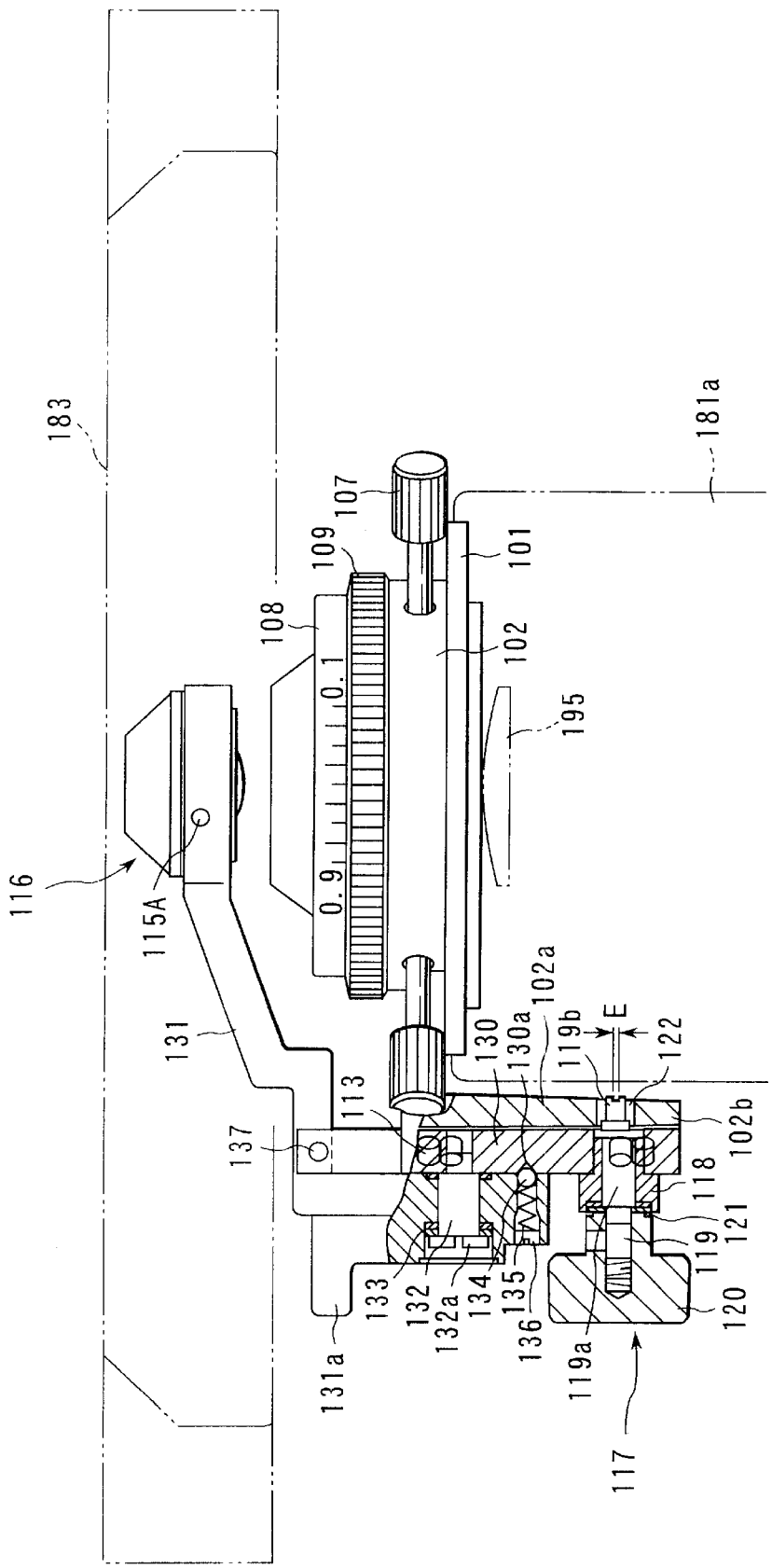
FIG. 15 is a partly cutaway front view of the transillumination condenser according to the fourth embodiment.

FIGS. 14 and 15 show the fourth embodiment. FIG. 14 is a cross-sectional view of a transillumination condenser. FIG. 15 is a partly cutaway front view of the transillumination condenser. The transillumination condenser of this embodiment is the same as that of the third embodiment except for a holding mechanism for a condenser group, and hence only a different portion will be described. The same reference numerals as in the third embodiment denote the same parts in the fourth embodiment, and a description thereof will be omitted.

Referring to FIGS. 14 and 15, a lens holding frame 131 serving as a condenser holding member having a condenser lens group 116 mounted thereon is rotatably supported by a shaft 132 threadably engaged with a movable guide 130.

A spring 133 is interposed between a head portion 132a of the shaft 132 and the lens holding frame 131 to bias the lens holding frame 131 to pivot it without any backlash. A click hole is formed in the lower portion of the lens holding frame 131, and a click ball 134 and click spring 135 are slidably fitted in the click hole.

The click ball 134 is biased and engaged in a click groove 130a cut in the movable guide 130 by a spring cover 136 that compresses/supports the click spring 135.

The click groove 130a is formed at a position where the lens holding frame 131 is clicked/stopped when the lens holding frame 131 pivots to insert the condenser lens group 116 in the illumination optical path or remove it therefrom.

A stopper screw 137 threadably engages with the movable guide 130 so that when the condenser lens group 116 is inserted in the illumination optical path, the position of the condenser lens group 116 can be finely adjusted.

A lens inserting/removing knob 131a is integrally formed upright on the lens holding frame 131 to allow the condenser lens group 116 to be easily inserted/removed. Other arrangements are the same as those of the third embodiment.

The operation of the transillumination condenser having the above arrangement will be described next.

When the lens inserting/removing knob 131a of the lens holding frame 131 is operated to insert the condenser lens group 116 in the illumination optical path, the lens holding frame 131 comes into contact with the stopper screw 137 of the movable guide 130, and the click ball 134 is biased and engaged in the click groove 130a by the click spring 135. Even if, therefore, the condenser lens group 116 is repeatedly inserted/removed, it can be done with high repeatability without any positional offset.

When the condenser lens group 116 is removed from the illumination optical path (the position indicated by a chain double-dashed line A in FIG. 14), illumination can be realized up to the observation range of an objective lens with a very low magnification of 1.25×. Other operations are the same as those in the third embodiment.

According to this embodiment, in addition to the effects of the third embodiment, since the condenser lens group 116 can be inserted/removed in/from the illumination optical path, illumination can be performed in accordance with the magnifications of objective lenses, ranging from a very low magnification to a high magnification.

In addition, since the condenser lens group 116 is inserted/removed in/from the illumination optical path on the back side, the condenser lens group 116 does not interfere with the operation of the aperture stop.

The modification of the third embodiment can be applied to this embodiment as well.

(Fifth Embodiment)

Figure 16:
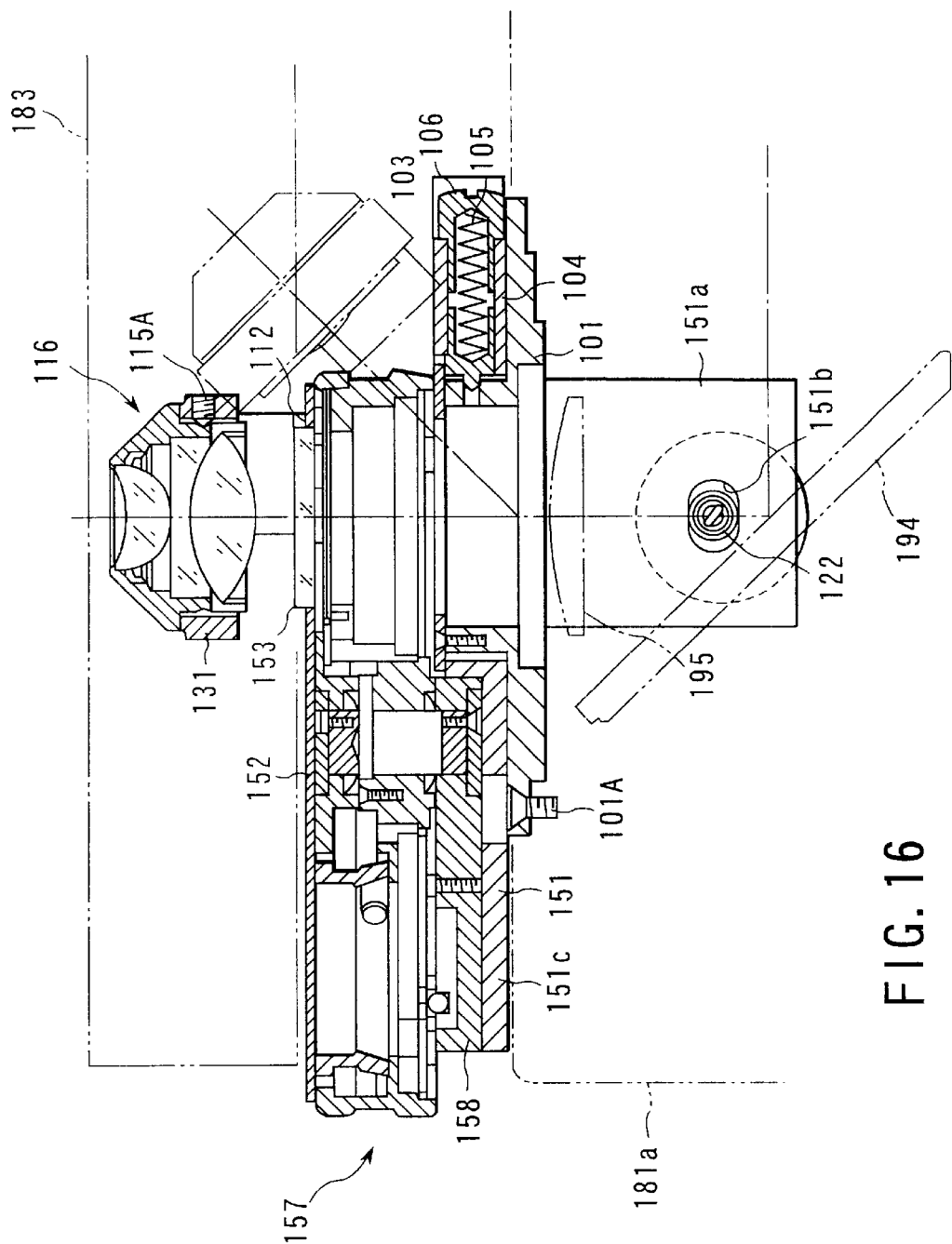
FIG. 16 is a cross-sectional view of a transillumination condenser according to the fifth embodiment.
Figure 17:
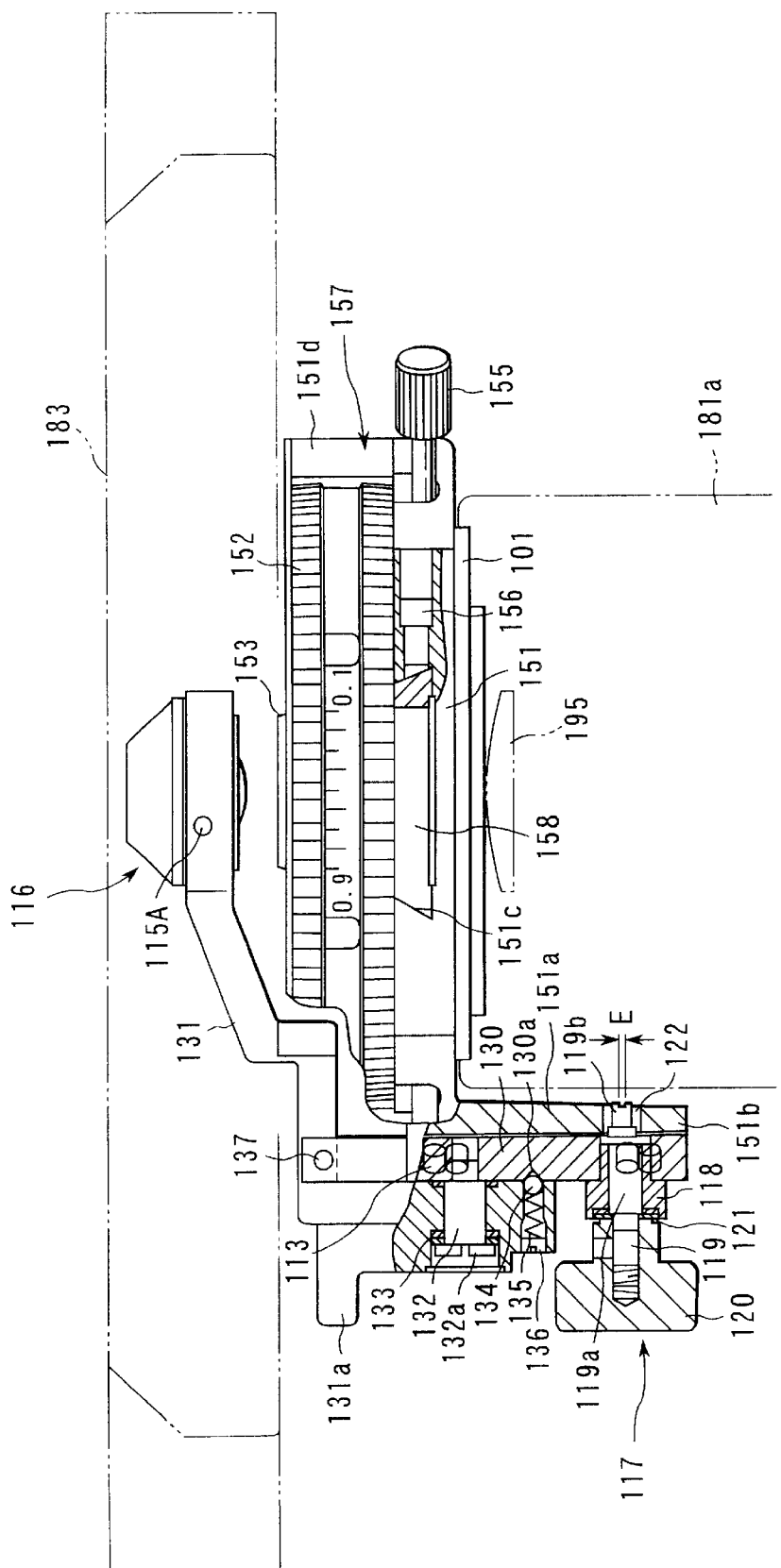
FIG. 17 is a partly cutaway view of the transillumination condenser according to the fifth embodiment.
Figure 18:
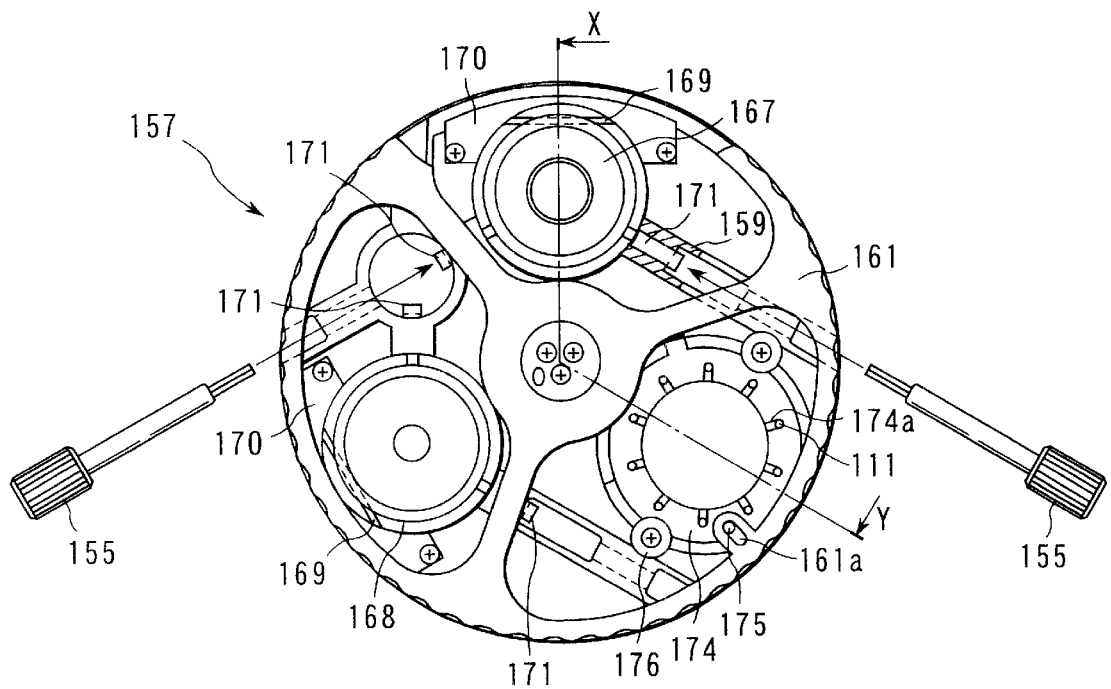
FIG. 18 is a plan view of the rotating turret portion of the transillumination condenser according to the fifth embodiment.
Figure 19:
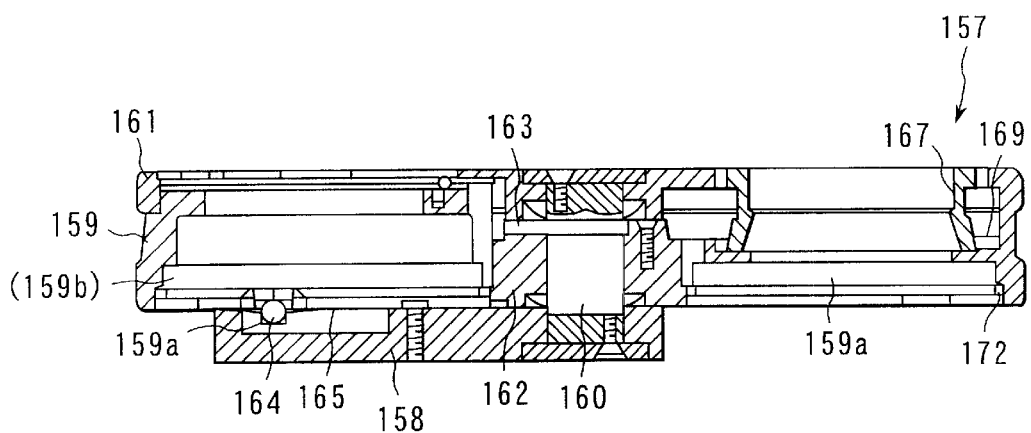
FIG. 19 is a sectional view taken along a line X-O-Y of the fifth embodiment in FIG. 16.

FIGS. 16 to 19 show the fifth embodiment. FIG. 16 is a cross-sectional view of a transillumination condenser. FIG. 17 is a partly cutaway front view of a portion of the transillumination condenser. FIG. 18 is a plan view of the rotating turret portion of the transillumination condenser. FIG. 19 is a sectional view taken along a line X-O-Y in FIG. 18.

This embodiment is equivalent to each of the transillumination condensers according to the third and fourth embodiments to which a rotating turret portion is added, and hence only different portions will be described. The same reference numerals as in the third and fourth embodiments denote the same parts in the fifth embodiment, and a description thereof will be omitted.

Referring to FIGS. 16 and 17, a centering frame 151 is mounted on a fixed frame 101 to be horizontally movable. As in the third and fourth embodiments, a fixed guide 151a vertically extends from the centering frame 151 along a side surface of a body base portion 181a. A movable guide 130 and moving mechanism 117 are disposed on the fixed guide 151a.

A dove-tail groove 151c is formed in the centering frame 151 to allow a rotating turret portion 157 (to be described later) to be mounted. A mounting dove-tail 158 of the rotating turret portion 157 is fixed in the dove-tail groove 151c with a set screw 156.

A turret cover 152 is mounted on the centering frame 151 through columns 151d formed upright on the left and right sides of the rotating turret portion 157 (to be described later). A dustproof cover 153 is fixed to the turret cover 152.

An aperture stop is not disposed in the centering frame 151 but is disposed in the rotating turret portion 157 (to be described later).

The centering frame 151 has a centering screw (not shown) similar to a centering screw 171 threadably engaged with a turret 159 shown in FIG. 18. When a detachable centering knob 155 is inserted in this centering screw and operated, the centering frame 151 can be moved to center a condenser lens group 116 by this operation in combination with the function of a spring 105 as in the third and fourth embodiments.

Referring to FIGS. 18 and 19, pivot shafts 160 are fixed to the turret 159 of the rotating turret portion 157. A mounting dove-tail 158 is rotatably mounted on one of the pivot shafts 160, and an aperture stop operation ring 161 is rotatably mounted on the other.

A leaf spring 162 is interposed between the turret 159 and the mounting dove-tail 158. A leaf spring 163 is interposed between the turret 159 and the aperture stop operation ring 161. The respective springs absorb thrust backlashes to make the turret 159 smoothly pivot.

A click spring 165 to which a click ball 164 is fixed is mounted on the mounting dove-tail 158. The click ball 164 is engaged in a click groove 159a formed in correspondence with each opening portion of the turret 159 to click/stop each opening portion of the turret 159 on the illumination optical path.

An aperture stop which is an iris stop whose aperture size can be adjusted is formed in the turret 159 in place of the centering frame 102 in the third and fourth embodiments.

This aperture stop is designed such that a stop frame 174 is rotatably placed on the upper surface of one opening portion of the turret 159, a plurality of aperture blades (not shown) are interposed between the turret 159 and the stop frame 174 as in the first embodiment, and a pair of upper and lower dowel pins 111 are fixed on the aperture blade.

A radial groove 174a is formed in the stop frame 174, and one of the dowel pins 111 fixed to the aperture blade (not shown) engages with the radial groove 174a. The other dowel pin 111 is rotatably fitted in a hole (not shown) formed in the turret 159.

A dowel pin 175 fixed near the outer surface of the stop frame 174 engages with a long hole 161a formed near the outer surface of the aperture stop operation ring 161, thereby forming an aperture stop designed such that as the aperture stop operation ring 161 pivots, the stop frame 174 pivots, and the plurality of aperture blades (not shown) act so as to adjust the aperture size.

Note that the floating of the stop frame 174 in the thrust direction is suppressed by a press plate 176 threadably engaged with the turret 159.

Ring slit frames 167 and 168 are held at the remaining opening portions of the turret 159 with press springs 169. The press springs 169 are fixed to the turret 159 with press plates 170.

The ring slit frames 167 and 168 are designed such that the centering screws 171 threadably engaged with the turret 159 are rotated by the detachable centering knobs 155 to move against the biasing forces of the press springs 169, thereby centering them.

The ring slit frames 167 and 168 can be detached from the turret 159 by unfastening the centering screws 171.

Filter pockets 159b are disposed below the three opening portions of the turret 159, and ring springs 172 for pressing inserted filters are mounted in the filter pockets 159b. Other arrangements are the same as those of the fourth embodiment.

The operation of the transillumination condenser having the above arrangement will be described next. When the turret 159 is rotated to insert the aperture stop in the optical path, the turret 159 is clicked/stopped by the click ball 164.

The aperture stop is adjusted by operating the aperture stop operation ring 161. When the aperture stop operation ring 161 is rotated, the stop frame 174 is pivoted through the dowel pin 175 slidably engaged with the long hole 161a. As a consequence, the size of the aperture stop changes.

When the turret 159 is rotated to insert the ring slit in the optical path, the turret 159 is clicked/stopped by the click ball 164.

In centering the ring slit, the centering knobs 155 for centering the condenser lens group 116 are removed from the centering screws (not shown) and inserted into the centering screws 171 of the ring slit frames 167 and 168, as shown in FIG. 18.

After the ring slit frames 167 and 168 are centered, the centering knobs 155 are removed from the centering screws 171 to allow the turret 159 to pivot without any interference.

As shown in FIG. 17, a set screw 156 threadably engaged with the centering frame 151 is unfastened to detach the rotating turret portion 157 so as to allow the ring slit frames 167 and 168 to be detached/replaced.

More specifically, the centering screws 171 (see FIG. 18) of the ring slits are sufficiently unfastened with the centering knobs 155, and the ring slit frames 167 and 168 are detached/replaced from the upper surface of the rotating turret portion 157.

Note that since the condenser lens group 116 is inserted/removed from the illumination optical path on the back side, the condenser lens group 116 does not interfere with the rotating turret portion 157. Other operations are the same as those of the fourth embodiment.

According to this embodiment, in addition to the effects of the fourth embodiment, since the rotating turret portion 157 is detached/attached to/from the centering frame 151 according to a slide dove-tail style, even if a distance LL (see FIG. 10) between the lower surface of a stage 183 and the body base portion 181a is set to be small to set the stage surface at a low level, the rotating turret portion 157 can be easily attached/detached.

To focus the field stop, only the condenser lens group 116 is moved and the rotating turret portion 157 does not vertically move. Therefore, the thickness of the rotating turret portion 157 can be minimized to lower the level of the stage surface.

In addition, since the condenser and ring slits can be centered from the front side, good operability can be obtained even with a small space.

Since the centering knobs 155 are detachable and commonly used for centering the condenser and ring slits, the respective centering knobs do not interfere with their operations.

Furthermore, since the ring slit frames can be interchanged by removing the rotating turret portion 157, phase-contrast ring slits and dark-field ring slits corresponding to various magnifications from a low magnification to a high magnification can be interchanged to realize versatile illumination.

Filters can be independently mounted in the respective opening portions of the turret 159. If, therefore, an ND filter or daylight filer is inserted in the optical path of the aperture stop and a green filter for improving contrast is inserted in the phase-contrast ring slit optical path, optimal illumination for a given observation method can be obtained by only rotating the turret without interchanging filters.

In this embodiment, the rotating turret portion 157 is mounted on the centering frame 151. However, a detachable slider may be mounted instead, and ring slit frames may be detachably mounted on this slider.

The modification of the third embodiment can also be applied to this embodiment. In addition, this embodiment has been described by exemplifying the case wherein the condenser lens group 116 is detachable. However, this embodiment can be applied to a case wherein the condenser lens group is fixed.

Note that the following technical ideas are derived from the embodiments described above.

(Additional Notes)

(1) A microscope according to claim 1 is characterized by comprising a centering mechanism for centering the condenser body by sliding it on the upper surface of the base portion.

According to note (1), in addition to the effects of claim 1, the center of the field stop can be aligned with the observation optical axis m by translating the condenser body with respect to the observation optical axis m.

(2) The microscope according to note (1) is characterized in that the centering screw for centering/adjusting the condenser body threadably engages with the condenser body, and the distal end of the centering screw is brought into contact with the fixed frame fixed on the upper surface of the base portion to center it.

According to note (2), in addition to the effects of note (1), since the centering screw threadably engaged with the condenser body on the upper surface of the base portion is placed to be almost horizontal to the fixed frame that is also placed on the upper surface of the base portion, centering/adjusting operation can be smoothly performed.

(3) The microscope according to note (1) is characterized in that the centering screw for centering/adjusting the condenser body threadably engages with the stage support, and the distal end of the centering screw is brought into contact with the condenser body to center it.

According to note (3), in addition to the effects of note (1), since the centering screw threadably engaged with the stage support placed on the upper surface of the base portion is placed to be almost horizontal to the condenser body on the upper surface of the base portion, centering/adjusting operation can be smoothly performed.

(4) The microscope according to claim 1 is characterized in that the stage support is shaped to surround the condenser body.

According to note (4), in addition to the effects of claim 1, since the stage support is placed outside the condenser body, the span for supporting the stage can be set to be large, and the rigidity of the stage can be increased.

(5) The microscope according to claim 1 is characterized by comprising an adjustable field stop between the illumination light source and the mirror.

According to note (5), in addition to the effects of claim 1, the visual field range can be easily widened/narrowed.

(6) The microscope according to note (5) is characterized by comprising a relay lens between the field stop and the mirror.

According to note (6), in addition to the effects of note (5), since the relay lens can focus illumination light, the visual field can be made brighter with the diameter of the visual field remaining the same.

(7) The microscope according to note (5) is characterized in that the field stop adjusting mechanism includes an operation lever that is placed below the mirror and extends from the left side surface, right side surface, or front surface of the microscope base portion.

According to note (7), in addition to the effects of note (5), since the operation lever is placed on the left side surface, right side surface, or front surface of the microscope base portion, a space can be ensured between the bottom surface of the microscope base and the upper surface of the stage, and the operation of the operation lever is facilitated.

(8) The microscope according to note (7) is characterized in that the field stop adjusting mechanism includes a field stop ring for adjusting the aperture of the field stop, and a link mechanism placed below the mirror and relay lens to transfer the operation amount of the operation lever to the field stop ring.

According to note (8), in addition to the effects of note (7), the operation amount of the operation lever can be transferred to the field stop ring to operate the field stop by using the link mechanism that operates in a narrow space.

(9) The microscope according to claim 1 is characterized by comprising an optical element turret which can hold a plurality of optical elements, serves to set/remove them at/from a position near the back-side focal position of the condenser, and is detachable with respect to the condenser body.

According to note (9), in addition to the effects of claim 1, even with a low stage, an optical element such as a pupil modulation optical element can be inserted.

(10) The microscope according to note (9) is characterized in that the optical element turret has an adjustable aperture stop.

According to note (10), in addition to the effects of note (9), the brightness of illumination light can be adjusted.

(11) The microscope according to claim 1 is characterized by comprising an optical element slider which can hold a plurality of optical elements, serves to set/remove them at/from a position near the back-side focal position of the condenser, and is detachable with respect to the condenser body.

According to note (11), in addition to the effects of claim 1, even with a low stage, an optical element such as a pupil modulation optical element can be inserted.

(12) The microscope according to note (11) is characterized in that the optical element slider has an adjustable aperture stop.

According to note (12), in addition to the effects of note (11), the brightness of illumination light can be adjusted.

(13) The microscope according to claim 1 is characterized in that the condenser support member includes an elevating knob for vertically moving the condenser lens, and the elevating knob is placed outside the stage support.

According to note (13), in addition to the effects of claim 1, even with a low stage, the elevating knob can be easily operated.

(14) The microscope according to claim 1 is characterized in that the microscope includes a support member for supporting and positioning the condenser lens and its holding member, and the condenser is detachably mounted.

According to note (14), the condenser can be interchanged with a condenser having a different focal length such as a low-distortion condenser for polarization observation.

(15) A microscope according to claim 4 is characterized in that the lens holding frame is supported rotatably with respect to the movable guide and is pivoted to insert/remove the condenser lens group mounted on the lens holding frame in/from the illumination optical path.

According to note (15), in addition to the effects of claim 4, illumination corresponding to objective lenses in a wide magnification range from a very low magnification to a high magnification can be performed because the condenser lens group is inserted in the illumination optical path when an objective lens having a high magnification is to be used, and removed from the illumination optical path when an objective lens having a very low magnification is to be used.

(16) The transillumination condenser of the microscope according to claim 4 or note (15) includes a rotating turret portion detachably mounted on the centering frame, an adjustable aperture stop placed in the rotating turret portion instead of the centering frame, and a plurality of ring slit frames detachably mounted on the rotating turret portion so as to be selectively inserted/removed in/from the illumination optical path.

According to note (16), in addition to the effects of claim 4 or note (15), versatile illumination can be realized because the aperture stop and ring slits are selectively inserted/removed in/from the illumination optical path, and ring slits are interchanged by detaching the rotating turret from the centering frame.

In each embodiment described above, the condenser lens has been described as a lens capable of being centered. When, however, a microscope of a type that requires no centering is to be used, the present invention can be practiced even if the adjusting mechanism is omitted.

According to claim 1, 2, or 3 of the present invention, since the condenser body is directly mounted on the upper surface of the base portion, and the stage is mounted at a position closest to the condenser lens because it does not move in the optical axis direction, the level of the specimen mount surface on the upper surface of the stage can be suppressed low with respect to the upper surface of the table. In addition, even if the thickness of a specimen varies or the focal position of the condenser deviates due to errors in manufacturing components, adjustments can be made by using the elevating mechanism for the condenser lens.

According to claim 2 of the present invention, in addition to the above effects since the respective members of the transillumination condenser can be housed and interchanged in the space in the form of a cantilever structure, a compact, inexpensive, easy-to-operate microscope having illumination performance equivalent to that of the conventional microscope can be obtained.

According to claim 3 of the present invention, in addition to the above effects, illumination means can be quickly changed in accordance with an interchange of objective lenses because the condenser lens can be easily inserted/removed in/from the illumination optical path within a narrow space even if objective lenses having different magnifications are interchanged.

According to claim 4 of the present invention, there is provided a transillumination condenser that ensures good operability and high stability even if it is applied to a microscope in which the level of the stage surface is minimized to improve operability associated with specimens because a sufficient guide length can be secured, with which the condenser lens group is vertically moved by the fixed and movable guides, to realize stable operation, and a large space for operation can be ensured.

(Sixth Embodiment)

An optical microscope according to the sixth embodiment of the present invention will be described next. This embodiment exemplifies an optical element slider mounted on an microscope having a movable stage support. Obviously, however, the optical element slider described in this embodiment can also be applied to the microscope with the fixed stage support described in each of the first to fifth embodiments.

Figures 20A, 20B, 20C:
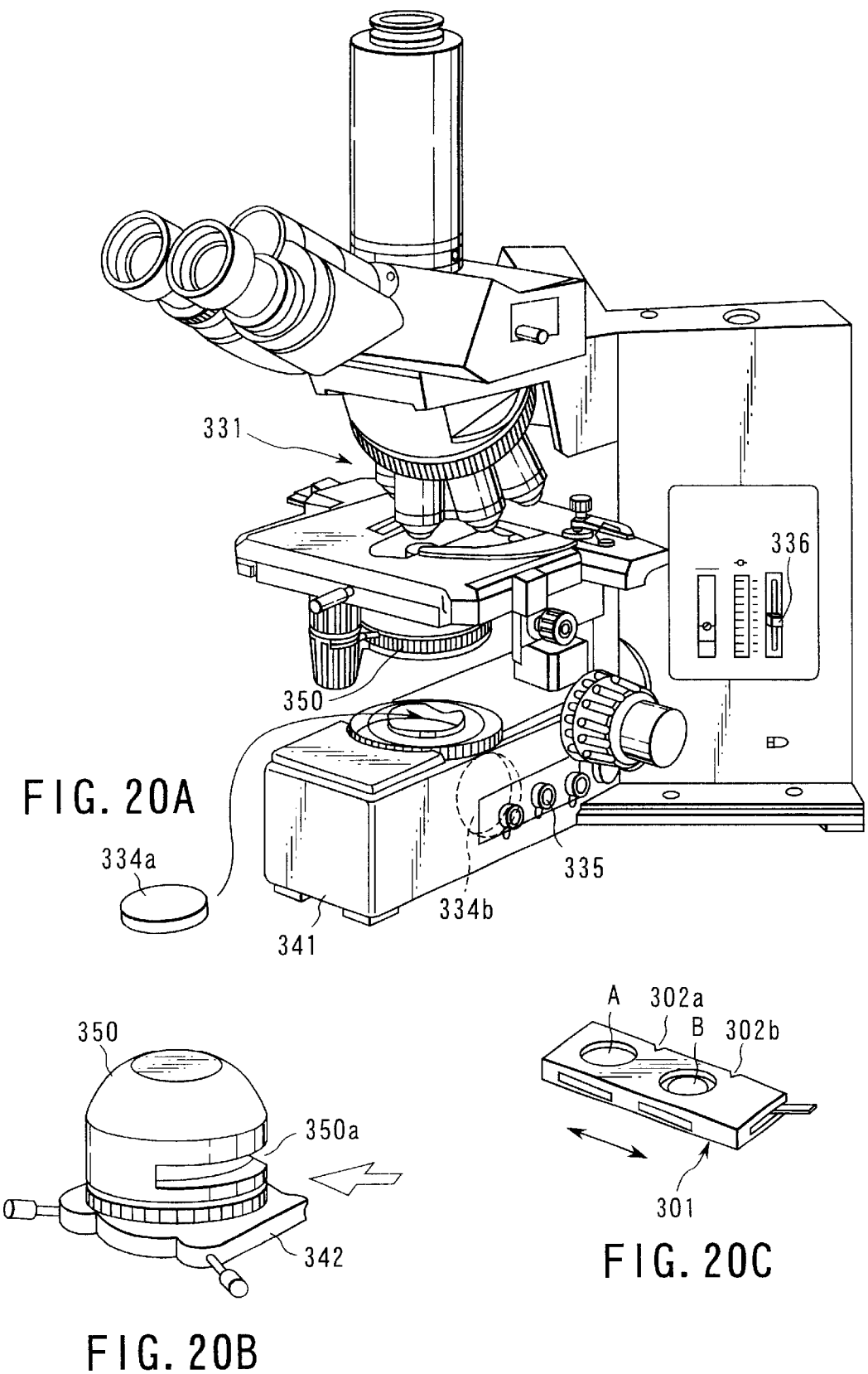
FIG. 20A is a perspective view of a microscope having an optical element slider according to the present invention.
FIG. 20B is a perspective view showing a condenser having a slider slot in the microscope according to the sixth embodiment.
FIG. 20C is a perspective view of the slider of the microscope according to the sixth embodiment.

FIGS. 20A to 20C are perspective views for explaining the sixth embodiment of the present invention. FIG. 20A is a perspective view showing the overall microscope. FIGS. 20B and 20C are perspective views showing a condenser in FIG. 20A and a slider to be inserted/removed in/from the condenser. The same reference numerals as in FIG. 2 denote the same parts as in FIGS. 20A to 20C, and a description thereof will be omitted.

In the sixth embodiment of the present invention, a slider slot 350a for allowing a slider 301 to be inserted/removed is formed in a condenser 350 of the microscope. The condenser 350 is supported by a condenser support 342 to be vertically movable.

The slider 301 allows an optical element having a pupil modulation function, e.g., a ring slit, and an optical component having no pupil modulation function, e.g., a filter, to be mounted and stacked in the optical axis direction, and has two light beam through holes A and B.

A ring slit or the like can be detachably mounted in the light beam through hole A, whereas an adjustable aperture stop serving as an optical element having a pupil modulation function is fixed in the light beam through hole B. Opening portions through which optical components such as filters can be inserted are formed in a side surface of the slider 301 at positions corresponding to both the light beam through holes A and B.

The slider slot 350a is formed in the condenser 350 at a position covering the back-side focal position of the condenser 350 to allow an optical element having a pupil modulation function, e.g., an aperture stop or ring slit, mounted in the slider 301 to be inserted/removed at the back-side focal position.

A plunger (not shown) is placed in the slider slot 350a. This plunger and click grooves 302a and 302b formed in a side surface of the slider 301 constitute a click mechanism to allow one of the two optical element holding portions A and B to be properly positioned with respect to the optical axis of the microscope.

In the present invention, an optical element having a pupil modulation function is an optical element located at the pupil position of an optical system to modulate the pupil in some form (including a change in pupil diameter) such as a ring slit or aperture stop 308.

A slider support is mounted on the lower surface of the condenser 350 of the microscope body, and the slider 301 on which a plurality of optical components such as filters and optical elements can be simultaneously mounted is slidably mounted on the slider support.

Figure 1:
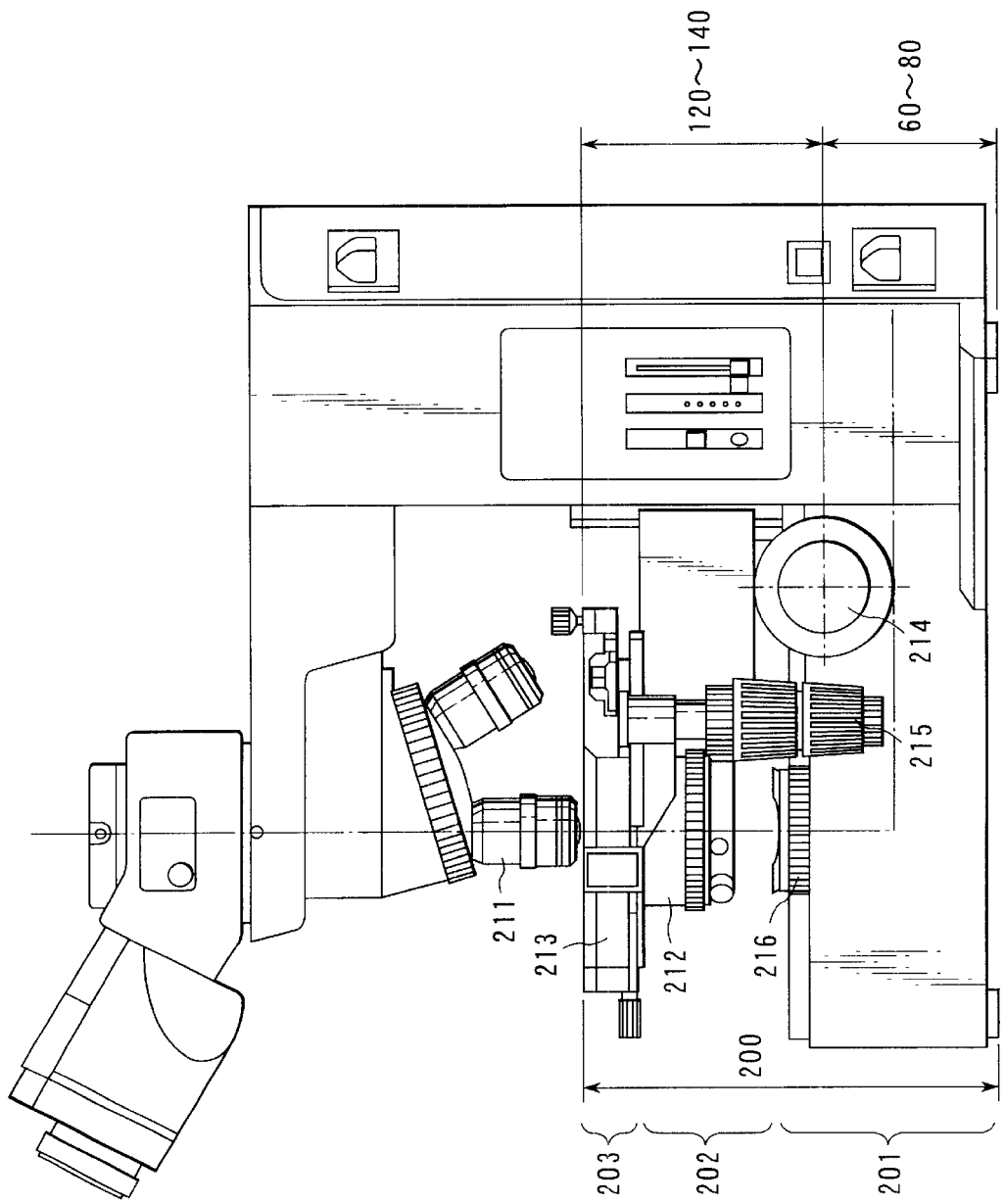
FIG. 1 is a side view of an erecting type microscope according to prior art 1.
Figure 2:
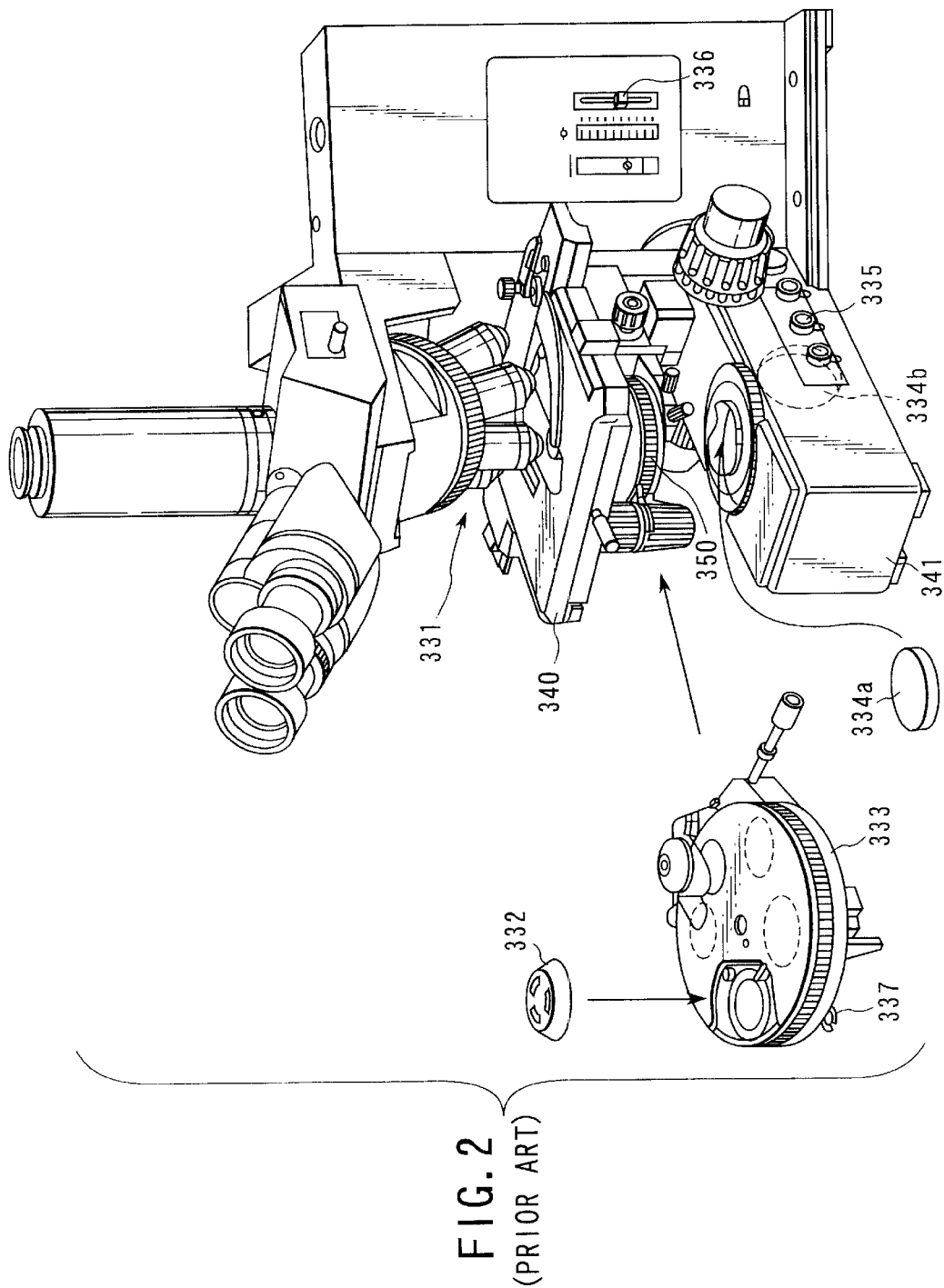
FIG. 2 is a perspective view for explaining problems in a microscope having a conventional optical element slider.

Since other arrangements are almost the same as those in FIG. 2, the same reference numerals as in FIG. 2 denote the same parts in this embodiment, and a description thereof will be omitted.

Figure 21:
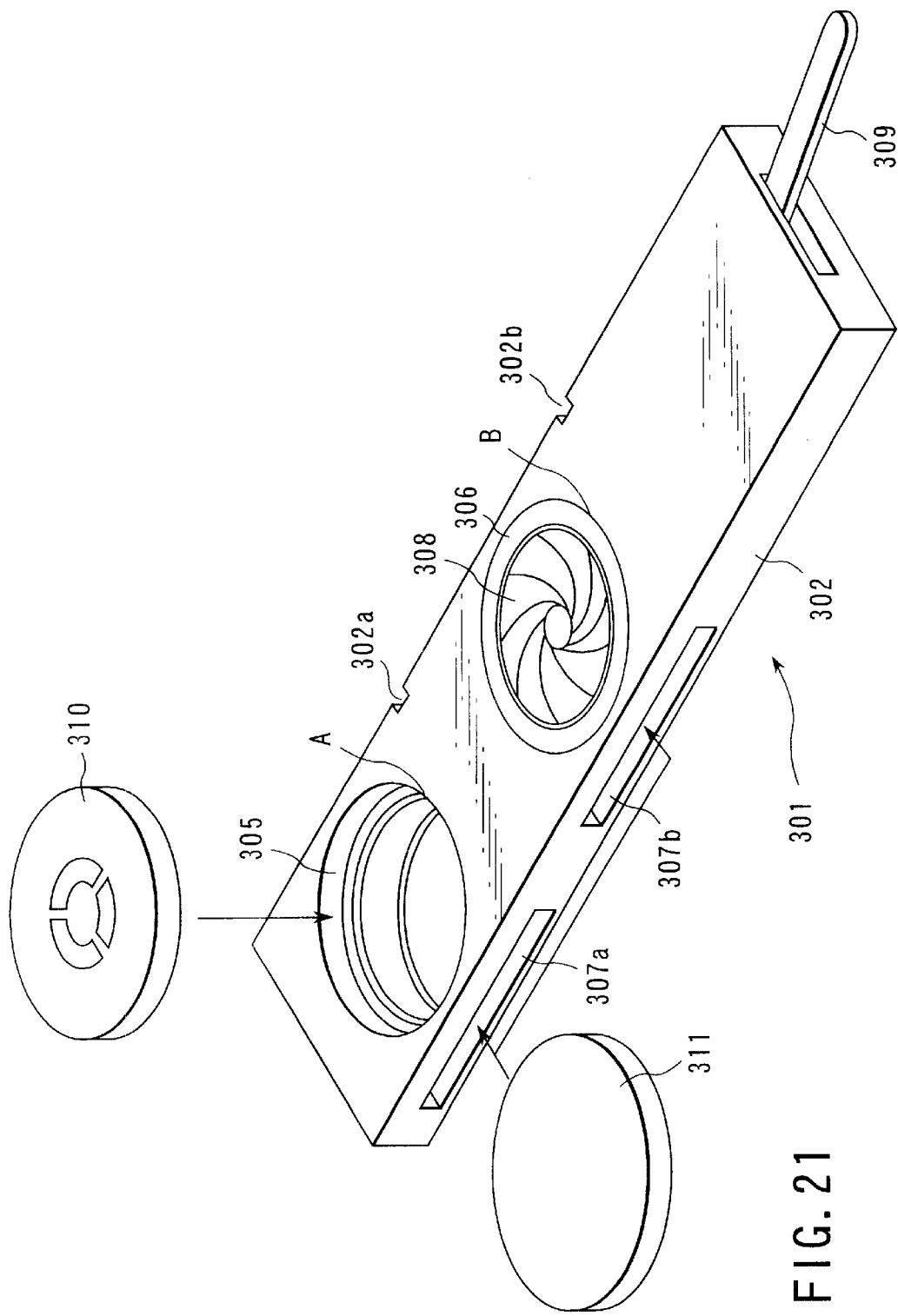
FIG. 21 is a perspective view for explaining the slider.

FIG. 21 is a perspective view for explaining the slider 301. The slider 301 is mainly comprised of a slider body 302, cover 303, and bottom cover 304, and has a rectangular parallelepiped shape as a whole. An optical element housing portion, e.g., an optical element opening portion 305, is formed in one end portion (the end portion on the left side in FIG. 21) of the slider 301 so as to extend through the upper and lower surfaces.

A stop housing portion, e.g., an aperture stop portion 306, is formed in the middle portion of the slider 301 to extend through the upper and lower surfaces. At least two optical component housing portions, e.g., filter opening portions 307a and 307b, are formed in the front-side side surface of the slider body 302 to cross the optical element opening portion 305 and aperture stop portion 306, respectively.

In addition, in the slider body 302, a lever 309 for opening/closing the aperture stop 308 is rotatably disposed, and the distal end portion of the lever 309 protrudes outside from the other end portion of the slider body 302 (the end portion on the opposite side to the side where the optical element opening portion 305 is formed).

A ring slit for a phase-contrast observation or dark-field observation is prepared as an optical element 310 having a pupil modulation function (as will be described later) is prepared in the optical element opening portion 305. The optical element 310 is detachably mounted in the optical element opening portion 305 to be arbitrarily interchanged with another optical element in accordance with the type of observation.

Filters 311 as optical components having no pupil modulation function (as will be described later) are detachably mounted in the filter opening portions 307a and 307b.

FIGS. 22A to 22D are views for explaining the slider 301 in detail. FIG. 22A is a plan view showing the slider 301 from which a cover (to be described later) is removed. FIG. 22B is a sectional view taken along a line B—B in FIG. 22A and viewed from the direction indicated by the arrows. FIG. 22C is a bottom view of the slider 301 from which a bottom cover (to be described later) is removed. FIG. 22D is a sectional view taken along a line D—D in FIG. 22B and viewed from the direction indicated by the arrows.

The aperture stop portion 306 serving as the above optical element having the pupil modulation function is formed in the middle of the upper surface of the slider body 302. A ring 312 is rotatably/slidably fitted in the aperture stop portion 306. The aperture stop 308 is placed on the ring 312, and the cover 303 is detachably fixed to on the slider body 302 with screws 313 so as to press the aperture stop 308.

A coupling pin 314 is integrally formed on the ring 312. The coupling pin 314 is slidably fitted in a long hole 315 formed in the proximal end portion of the lever 309. A boss 317 integrally formed on a portion of the slider body 302 is fitted in a hole 316 formed at the middle position of the lever 309. In this arrangement, the lever 309 pivots about the boss 317 serving as a fulcrum.

By moving the lever 309, the ring 312 can be rotated through the long hole 315 and coupling pin 314, thus opening/closing the aperture stop 308.

Filter opening portions 307a and 307b are formed in the side surface of the slider body 302 at positions below the optical element opening portion 305 and aperture stop portion 306 so as to respectively cross them. Filters 311 can be inserted in these opening portions.

The bottom cover 304 is fixed to the bottom surface of the slider body 302 with screws 320 and serves as a press member for the filters 311. In the filter opening portions 307a and 307b, elastic portions or lugs 318a and 318b are integrally formed on the slider body 302 by, for example, cutting, respectively. In this case, the elastic portions 318a and 318b are positioned to serve as press members for the filters 311 when they are inserted in the filter opening portions 307a and 307b. Small opening portions 319a and 319b are respectively formed in the opposite side surface of the slider body 302 to the side where the filter opening portions 307a and 307b are formed.

The user inserts the filters 311 from the filter opening portions 307a and 307b while spreading the elastic portions 318a and 318b wide. After the insertion, the elastic portions 318a and 318b serve as fixing members for preventing the filters 311 from shifting laterally. The user removes filters 311 by pushing side surfaces of the filters outside the small opening portions 319a and 319b by using a rod-like jig.

In the optical element slider having the above arrangement, if filters 311 to be inserted are selected in accordance with the optical elements 310 to be mounted, the filters 311 can be switched concurrently with switching of the optical elements 310. In addition, since the aperture stop 308 does not move unless the lever 309 is touched, the aperture stop need not be readjusted when a bright-field observation is restored.

According to the embodiment described above, a compact optical element slider with high operability and a simple arrangement can be obtained, in which the slider 301 has the optical elements 310 and filters 311, and hence can be switched at once by one sliding operation.

The filter opening portions 307a and 307b respectively have the elastic projections 318a and 318b, which serve to prevent the filters 311 from slipping off after insertion. Therefore, the filters 311 do not slip off even if the slider 301 vibrates when it is mounted in the microscope or is held sideways when it is removed from the microscope.

The small opening portions 319a and 319b smaller in diameter than the filters 311 are formed in the opposite side surface of the slider body 302 to the side where the filter insertion portions of the filter opening portions are formed. Therefore, each filter 311 can be pushed outside by pushing it with a rod-like jig through the opening portion when it is removed from the slider body 302.

Furthermore, since the aperture stop 308 is placed in the aperture stop portion 306, an observation can always be made through the aperture stop during a bright-field observation.

The present invention is not limited to the above embodiment and can be practiced upon the following modifications.

(1) Referring to FIGS. 22A to 22D, the filter 311 having a diameter equal to the width of the slider body 302 is inserted therein. However, filters 311 each having a smaller diameter may be used by reducing the filter opening portions 307a and 307b in size.

(2) Referring to FIGS. 22A to 22D, only one bright-field observation optical element 310 can be seen. However, more optical elements 310 may be seen by elongating the slider body 302 and increasing optical element opening portions 305 in number. Alternatively, the bright-field observation aperture stop may be omitted, and all opening portions may be made to serve as optical element opening portions 305, thereby simplifying the arrangement of the slider body 302.

(3) Referring to FIGS. 22A to 22D, the optical element 310 is just placed on the slider body 302. However, an optical element fixing mechanism for pressing/fixing the optical element 310 from a side surface with a set screw (headless screw) may be added to prevent the optical element 310 from being easily removed from the slider body 302, thereby allowing the optical element 310 to be used in the vertical direction as in an incident-light phototube.

(4) Referring to FIGS. 22A to 22D, the optical element 310 is just placed on the slider body 302. However, this embodiment may include a centering mechanism for accurately aligning the center of the optical element 310 with an observation optical axis, which includes a plunger for holding the optical element 310 to make it movable within a plane perpendicular to the optical axis and biasing the element in one direction within the plane, and a center screw for pressing/adjusting the optical element 310 to make it oppose the plunger.

(5) The number of filters 311 inserted in each of the filter opening portions 307a and 307b is not limited to one, and a plurality of filters may be housed.

(6) As the optical elements having the pupil modulation function, the ring slit and aperture stop have been exemplified. However, as other examples optical elements, a Hoffman slit, relief contrast slit, and differential interference prism may be used.

In addition to the claims associated with the embodiments described above, the present invention includes the following aspect. There is provided an optical element slider comprising a slider serving as part of the optical path of an optical device, e.g., a microscope, and slidably mounted in the structure of the microscope body, and having optical element housing portions for housing at least first and second optical elements, and at least first and second optical component housing portions formed to cross the respective optical element housing portions and respectively housing optical components such as filters, and a plurality of optical elements and a plurality of optical components detachably inserted in the optical element housing portions and optical component housing portions. The respective optical element housing portions are opening portions extending through the slider body in a predetermined direction, and the respective optical component housing portions are opening portions extending through the slider body to cross the respective optical element housing portions. Of the opening portions serving as the optical component housing portions, the size of each opening portion in which an optical component is inserted is set to be larger than the outer size of the optical component to be inserted. Of the opening portions serving as the optical component housing portions, the size of each opening portion in which no optical component is inserted is set to be smaller than the outer diameter of the optical component. Each opening portion with the small size is used to remove the optical component. Each optical component housing portion has a projection that elastically deforms when an optical component is inserted in the optical component housing portion, and prevents the optical component from laterally shifting after it is inserted.

As has been described in detail above, according to the present invention, there is provided a compact optical element slider with high operability and a simple arrangement, which allows optical components such as optical elements and filters to be simultaneously interchanged with other components by one interchanging operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope having a mirror for deflecting light from an illumination light source in a direction of an objective lens and illuminating a specimen via a condenser lens disposed above the mirror, comprising:

a stage support which is mounted on an upper surface of a base portion of the microscope to fix a stage, on which a specimen is placed, with respect to an optical axis direction of the objective lens;

a condenser body mounted on the upper surface of the base portion of the microscope;

a condenser lens holding member which holds a condenser lens and which is supported by the condenser body;

an elevating mechanism which vertically moves said condenser lens holding member;

a focusing mechanism which moves the objective lens in the optical axis direction an aperture stop fixed to the condenser body, wherein the condenser body is fixed to the fixed frame so as to center the condenser lens, wherein said elevating mechanism comprises:

a fixed guide integrally formed on said condenser body and mounted along a side surface of the base portion, and a movable guide mounted to be movable with respect to said fixed guide, and wherein said condenser lens holding member is fixed to said movable guide.

2. A microscope according to claim 1, wherein said stage support has a cantilever structure fixed to the base portion.

3. A microscope according to claim 1, wherein said condenser lens holding member is rotatable with respect to the condenser body, and the condenser lens is removed from an illumination optical path by rotating said condenser lens holding member.

4. A microscope according to claim 1, further comprising a centering mechanism for centering the condenser lens by sliding said condenser body on the upper surface of the base portion.

5. A microscope according to claim 1, further comprising a field stop for adjusting a visual field, said field stop being disposed between the illumination light source and the mirror.

6. A microscope according to claim 1, further comprising an optical element turret which holds a plurality of optical elements, serves to insert and remove the optical elements in and from a place near a back-side focal position of the condenser, and is detachable with respect to said condenser body.

7. A microscope according to claim 1, further comprising an optical element slider which holds a plurality of optical elements, serves to insert and remove the optical elements in and from a place near a back-side focal position of the condenser, and is detachable with respect to said condenser body.

8. A microscope according to claim 1, wherein said condenser lens holding member is detachable with respect to said condenser body.

9. A transillumination condenser comprising:

a fixed frame fixed to a microscope body base portion and which is provided above a mirror for deflecting an illumination light to an objective lens;

a centering frame mounted on said fixed frame;

an aperture stop placed on said centering frame and vertically extending along a side surface of the body base portion;

a movable guide movably mounted on said fixed guide;

a lens holding frame supported on said movable guide;

a condenser lens group mounted on said lens holding frame; and a moving mechanism for vertically moving said movable guide.

10. A condenser according to claim 9, wherein said lens holding frame is supported to be rotatable with respect to said movable guide and rotated to insert and remove the condenser lens group mounted on said lens holding frame in and from an illumination optical path.

11. A condenser according to claim 9, wherein the centering frame has a rotating turret portion detachable with respect to said centering frame and the rotating turret portion has an aperture stop and a plurality of ring slit frames detachable with respect to said turret position.

12. A microscope comprising:

an illumination light source;

a mirror for deflecting light from said illumination light source in a direction of an objective lens; and a transillumination condenser placed above said mirror, said transillumination condenser including a fixed frame fixed to a microscope body base portion, a centering frame mounted on said fixed frame, an aperture stop placed in said centering frame, a fixed guide formed integrally with said centering frame and vertically extending along a side surface of the body base portion, a movable guide movably mounted on said fixed guide, a lens holding frame supported on said movable guide, a condenser lens group mounted on said lens holding frame, and a moving mechanism for vertically moving said movable guide.

13. A microscope according to claim 12, further comprising a stage support which is mounted on an upper surface of said base portion to permanently hold a stage, on which a specimen is placed, in an optical axis direction of the objective lens.

14. A microscope according to claim 13, wherein said stage support has only one end side mounted on said base portion of said microscope.

15. A microscope according to claim 12, wherein said lens holding frame is rotatable with respect to said movable guide and is rotated to remove the condenser lens group from an illumination optical path.

16. A microscope according to claim 15, further comprising a click mechanism for positioning said lens holding frame when the condenser lens group is to be removed from the optical path and is to be inserted in the optical path.

\* \* \* \* \*